(12) United States Patent
Huang

(10) Patent No.: US 11,635,591 B2
(45) Date of Patent: Apr. 25, 2023

(54) LENS ATTACHMENT OF REDUCED FOCUS AND INCREASED LIGHT ADMITTANCE

(71) Applicant: Shenzhen Jueying Technology Co., Ltd., Shenzhen (CN)

(72) Inventor: Muji Huang, Shenzhen (CN)

(*) Notice: Subject to any disclaimer, the term of this patent is extended or adjusted under 35 U.S.C. 154(b) by 263 days.

(21) Appl. No.: 17/026,329

(22) Filed: Sep. 21, 2020

(65) Prior Publication Data
US 2022/0003967 A1  Jan. 6, 2022

(30) Foreign Application Priority Data
Jul. 3, 2020 (CN) .......................... 202010634858.9

(51) Int. Cl.
*G02B 9/60* (2006.01)
*G02B 13/00* (2006.01)
*G02B 27/00* (2006.01)
*H04N 23/55* (2023.01)

(52) U.S. Cl.
CPC ........... *G02B 13/0045* (2013.01); *G02B 9/60* (2013.01); *G02B 27/0025* (2013.01); *H04N 23/55* (2023.01)

(58) Field of Classification Search
None
See application file for complete search history.

(56) References Cited

U.S. PATENT DOCUMENTS

| 2003/0151827 A1* | 8/2003 | Tsutsumi | G02B 15/08 359/675 |
| 2015/0226943 A1* | 8/2015 | Ogata | G02B 15/12 359/675 |
| 2017/0277022 A1* | 9/2017 | Ori | G02B 9/52 |

* cited by examiner

*Primary Examiner* — Darryl J Collins
(74) *Attorney, Agent, or Firm* — Prakash Nama; Global IP Services, PLLC

(57) ABSTRACT

A lens attachment, used with an objective lens, including from object side to image side, a first lens element with positive power, a second lens element with negative power, a third lens element with positive power, a fourth lens element with negative power, and a fifth lens element with positive power; the second and third lens elements form a doublet by adhesive; at least two of the third, fourth and fifth lens elements are anomalous dispersion lenses.

10 Claims, 28 Drawing Sheets

LENS ATTACHMENT OF REDUCED FOCUS AND INCREASED LIGHT ADMITTANCE

BACKGROUND OF THE INVENTION

The present invention relates to the technical field of camera lens of reduced focus and increased light admittance. Specifically, the present invention relates to an optical lens attachment of reduced focus and increased light admittance. The present invention can reduce the focal length and focal ratio of an objective lens, so that a camera of a small format size can simultaneously attain the vision equivalent to a large format size and a relatively long working distance.

US2013/0064532 describes a kind of focal reducing attachment, which is disclosed as an optical attachment for reducing the focal length of an objective lens. The attachment disclosed by US2013/0064532 contains four lens elements in an order from an object side to an image side, a first lens element having a first negative power and an object-side concave surface, a second lens element having a first positive power and an object-side surface having a curvature CvOb2, a third lens element having a second negative power greater than the first negative power and having an image-side surface having a curvature CvIm3, and a fourth lens element having a second positive power and an image-side surface, wherein the focal reducing attachment has an overall power φs such that (CvOb2+CvIm3)/φs>3 and an overall magnification M such that 0.5<M<1.

Although the focal reducing attachment disclosed by US2013/0064532 functions well in a range of applications, it is limited by its own relatively simple structure. The limitations include chromatic aberration, field curvature and higher order coma. Also, a distance between the objective lens and the focal reducing attachment is small, and therefore the varieties of objective lenses that are adaptable to be used are limited.

BRIEF SUMMARY OF THE INVENTION

In view of the aforesaid disadvantages now present in the prior art, the present invention provides an optical lens attachment of reduced focus and increased light admittance. The present invention can reduce aperture ratio, so that more SLR lenses are adaptable to a mirrorless camera. Further, a plurality of anomalous dispersion glasses are used to minimize aggravation of chromatic aberration and to maintain a compact structure of the present invention. Moreover, a distance between the objective lens and the lens attachment is increased, so as to increase the varieties of objective lenses that are adaptable to the lens attachment.

In order to attain the above objects, the present invention provides the following technical solutions:

A lens attachment, adapted to be used with an objective lens; the lens attachment comprises, in a sequential order from an object side to an image side:

a first lens assembly, comprising a first lens element which is a crescent-shape spherical lens having a positive power wherein a front surface of the first lens element is convex towards the object side and a rear surface of the first lens element is concave towards the object side;

a second lens assembly, comprising a second lens element and a third lens element; the second lens element is a biconcave spherical lens having a negative power wherein a front surface of the second lens element is concave towards the image side and a rear surface of the second lens element is concave towards the object side, the third lens element is a biconvex spherical lens having a positive power wherein a front surface of the third lens element is convex towards the object side and a rear surface of the third lens element is convex towards the image side; the second lens element and the third lens element form a doublet by pairing with each other via adhesive;

a third lens assembly, comprising a fourth lens element which is a biconcave spherical lens having a negative power wherein a front surface of the fourth lens element is concave towards the image side and a rear surface of the fourth lens element is concave towards the object side; and a fourth lens assembly, comprising a fifth lens element which is a biconvex lens having a positive power wherein a front surface of the fifth lens element is convex towards the object side and a rear surface of the fifth lens element is convex towards the image side;

the lens attachment fulfills the following requirement:

$$1<(CvObj2+CvIma4)/\varphi<3; \text{ and } 0.5<M<1;$$

wherein φ is a power of the lens attachment, M is an overall magnification of the lens attachment, CvObj2 is a curvature of an object-side surface of the second lens element, CvIma4 is a curvature of an image-side surface of the fourth lens element;

at least two of the third lens element, the fourth lens element and the fifth lens element are anomalous dispersion lenses.

Preferably, a combination of the lens attachment and the objective lens defines an f-number of 0.9 or greater.

Preferably, having undercorrected or overcorrected spherical aberration for as many as dual-wavelengths.

Preferably, the lens attachment fulfills the following requirement:

$$0.20 \leq TL \cdot \varphi \leq 0.25;$$

wherein TL is a vertex distance between an object-side surface of the first lens element and an image-side surface of a last lens element.

Preferably, an objective lens has a first vertex length; a combination of the lens attachment and the objective lens defines a second vertex length; the second vertex length is shorter than the first vertex length; wherein said vertex length represents a length from a vertex of an object-side surface of the objective lens to an image plane.

Preferably, the objective lens is configured as a 35 mm SLR (single-lens reflex) lens; the lens attachment has an object side mounted onto the 35 mm SLR lens and an image side mounted onto an imaging unit.

Preferably, a specification of the imaging unit is selected from the following: M4/3 format, APS-C format, or APS format.

Preferably, the object side of the lens attachment is configured as an interface that is adaptable to the objective lens to be connected.

Preferably, the lens attachment also comprises a fifth lens assembly, comprising a sixth lens element which is a biconcave spherical lens having a negative power wherein a front surface of the sixth lens element is concave towards the image side and a rear surface of the sixth lens element is concave towards the object side; the sixth lens element is positioned at a side of the fifth lens elements away from the image side.

A lens attachment, adapted to be used with an objective lens and an imaging unit; the lens attachment comprises, in a sequential order from an object side to an image side:

a first lens assembly, comprising a first lens element which is a crescent-shape spherical lens having a positive power wherein a front surface of the first lens element is convex towards the object side and a rear surface of the first lens element is concave towards the object side;

a second lens assembly, comprising a second lens element and a third lens element; the second lens element is a biconcave spherical lens having a negative power wherein a front surface of the second lens element is concave towards the image side and a rear surface of the second lens element is concave towards the object side, the third lens element is a biconvex spherical lens having a positive power wherein a front surface of the third lens element is convex towards the object side and a rear surface of the third lens element is convex towards the image side; the second lens element and the third lens element form a doublet by pairing with each other via adhesive;

a third lens assembly, comprising a fourth lens element which is a biconcave spherical lens having a negative power wherein a front surface of the fourth lens element is concave towards the image side and a rear surface of the fourth lens element is concave towards the object side; and a fourth lens assembly, comprising a fifth lens element which is a biconvex lens having a positive power wherein a front surface of the fifth lens element is convex towards the object side and a rear surface of the fifth lens element is convex towards the image side;

the lens attachment fulfills the following requirement:

$$1<(CvObj2+CvIma4)/\varphi<3; \text{ and } 0.5<M<1;$$

wherein $\varphi$ is a power of the lens attachment, M is an overall magnification of the lens attachment, CvObj2 is a curvature of an object-side surface of the second lens element, CvIma4 is a curvature of an image-side surface of the fourth lens element;

at least two of the third lens element, the fourth lens element and the fifth lens element are anomalous dispersion lenses.

Beneficial effects of the present invention: The present invention has a more compact structure. Use of a doublet obtained by adhesive and at least two anomalous dispersion lenses minimize aggravation of chromatic aberration after the lens attachment is mounted. Further, a distance between the objective lens and the lens attachment is increased, so as to increase the varieties of objective lenses that are adaptable to the lens attachment and reduce the focal length of the objective lens and reduce the focal ratio. By using the present invention, a camera of a small format size can simultaneously attain the vision equivalent to a large format size and a relatively long working distance.

DETAILED DESCRIPTION OF THE INVENTION

It should be understood that, in the description below, terms indicating directions or positional references such as "in the middle", "upper", "lower", "left", "right", "vertical", "horizontal", "inner" and "outer" should be understood based on the directions or positional references shown according to the figures. These terms are used merely for the ease of describing the invention and for simplifying the description, and should not be understood to indicate or suggest that the positions or elements referred to must be oriented to specific directions or be configured and operated according to the specific directions, and thus these terms should not be considered limiting the present invention.

Details of four different embodiments are disclosed below, wherein tables 1a, 2a, 3a and 4a indicate compositional data of embodiments 1-4 respectively, and tables 1b, 2b, 3b and 4b indicate specification data of embodiments 1-4 respectively. In said tables, $\varphi$ is the power of the lens attachment, M is an overall magnification of the lens attachment, CvObj2 is the curvature of the object-side surface of the second lens element 2, CvIma4 is the curvature of the image-side surface of the fourth lens element 4, and TL is a vertex distance between the object-side surface of the first lens element 1 and the image-side surface of the fifth lens element 5.

Embodiment 1

Figure 1:
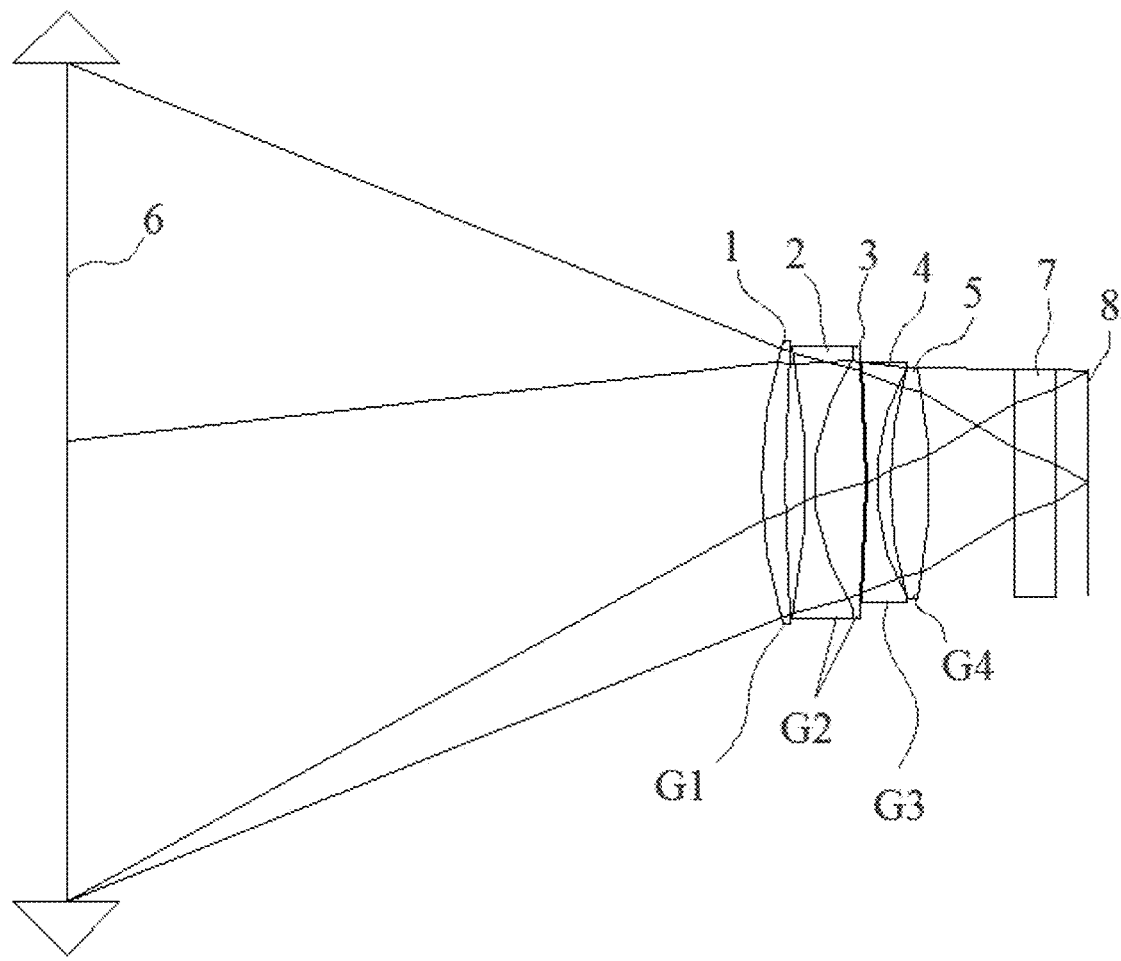
FIG. 1 is a schematic illustration according to embodiment 1.
Figure 2:
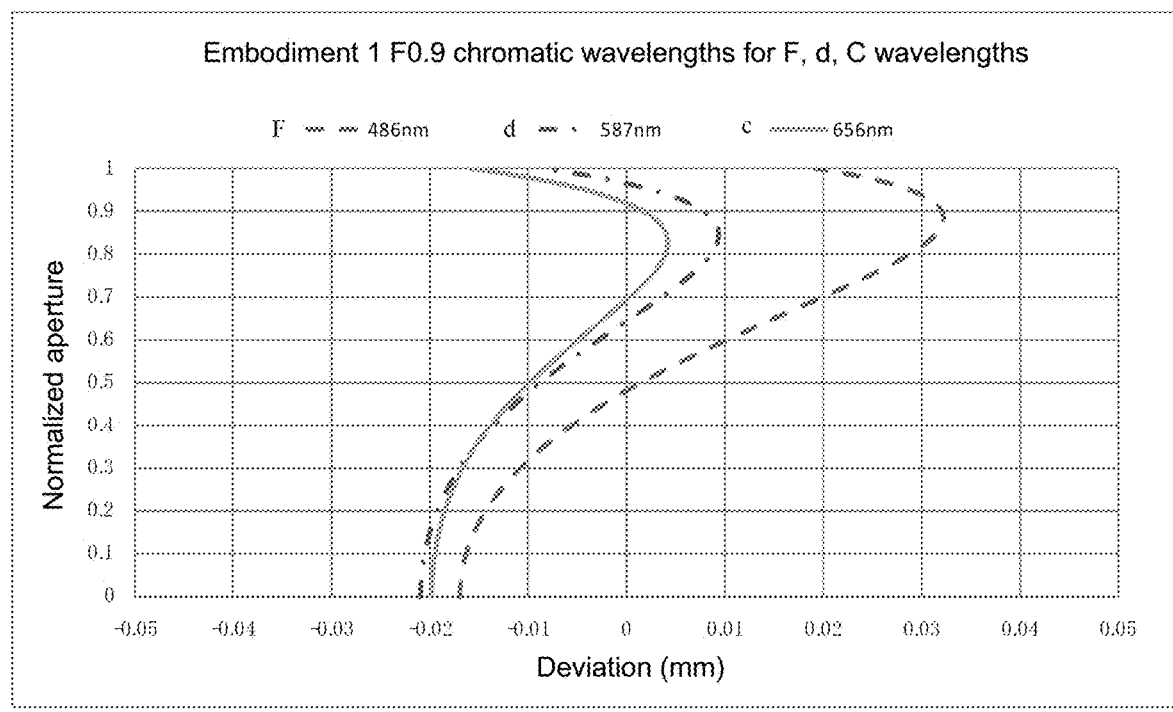
FIG. 2 shows the spherical aberrations of F, d and C wavelengths for f-number F0.9 according to embodiment 1.
Figure 3:
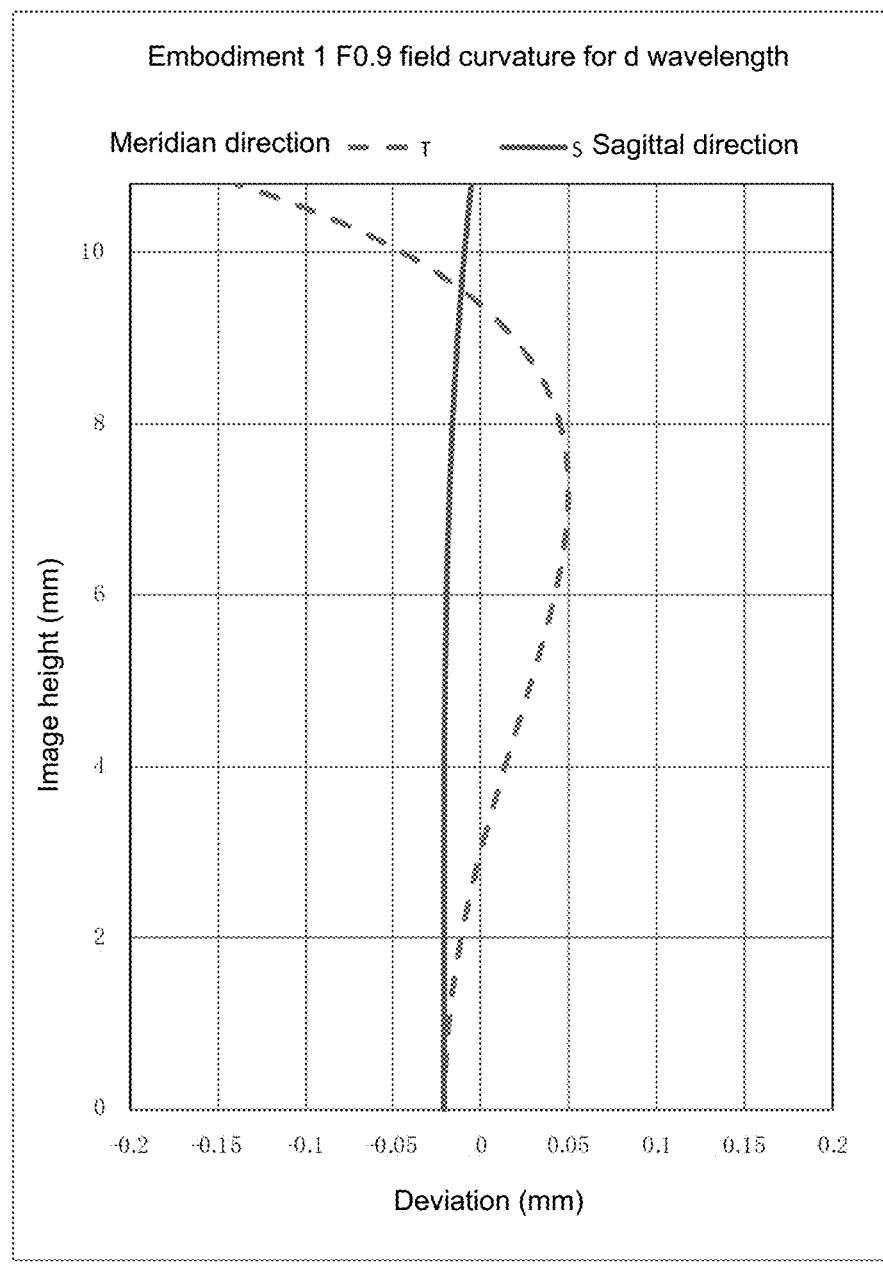
FIG. 3 shows the field curvature of d wavelength for f-number F0.9 according to embodiment 1.
Figure 4:
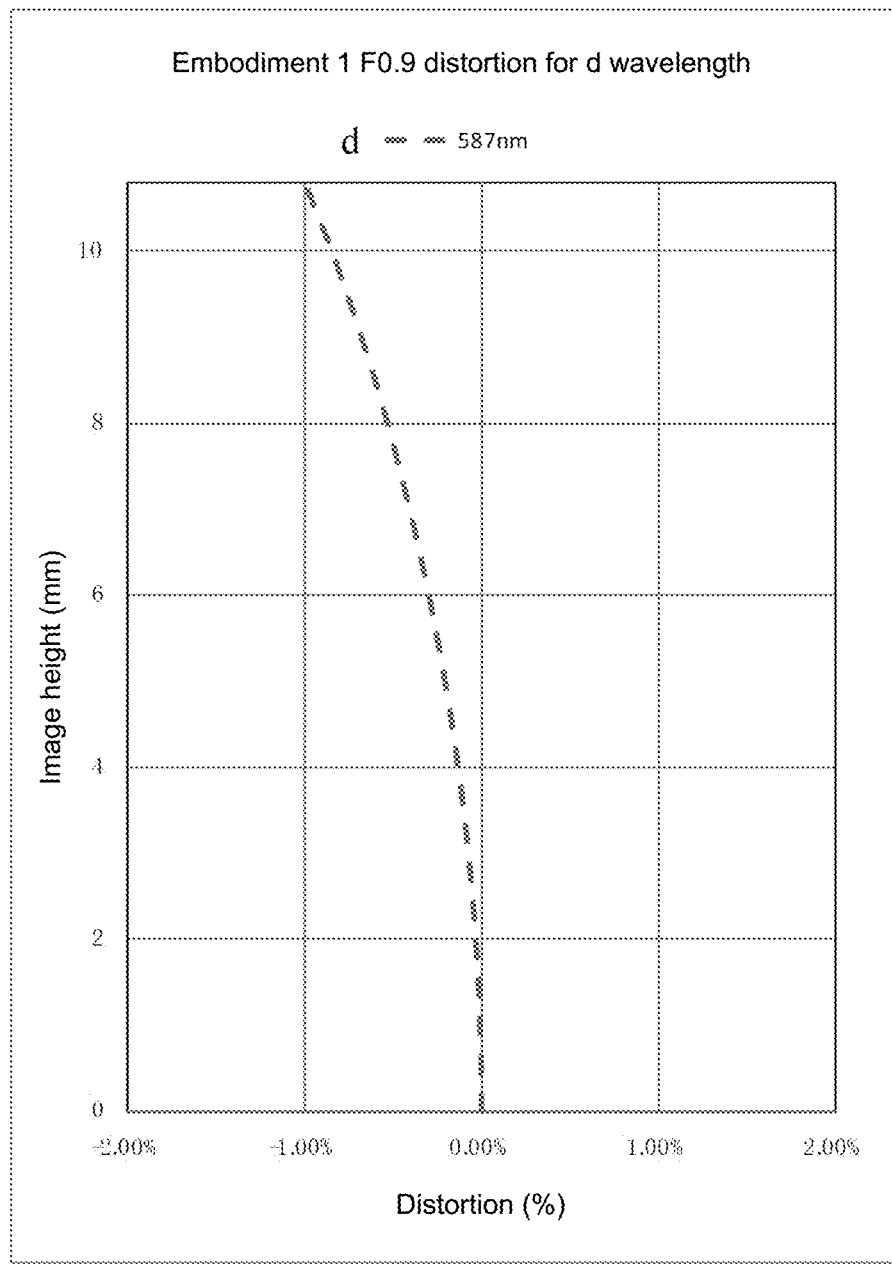
FIG. 4 shows the distortion of d wavelength for f-number F0.9 according to embodiment 1.
Figure 5:
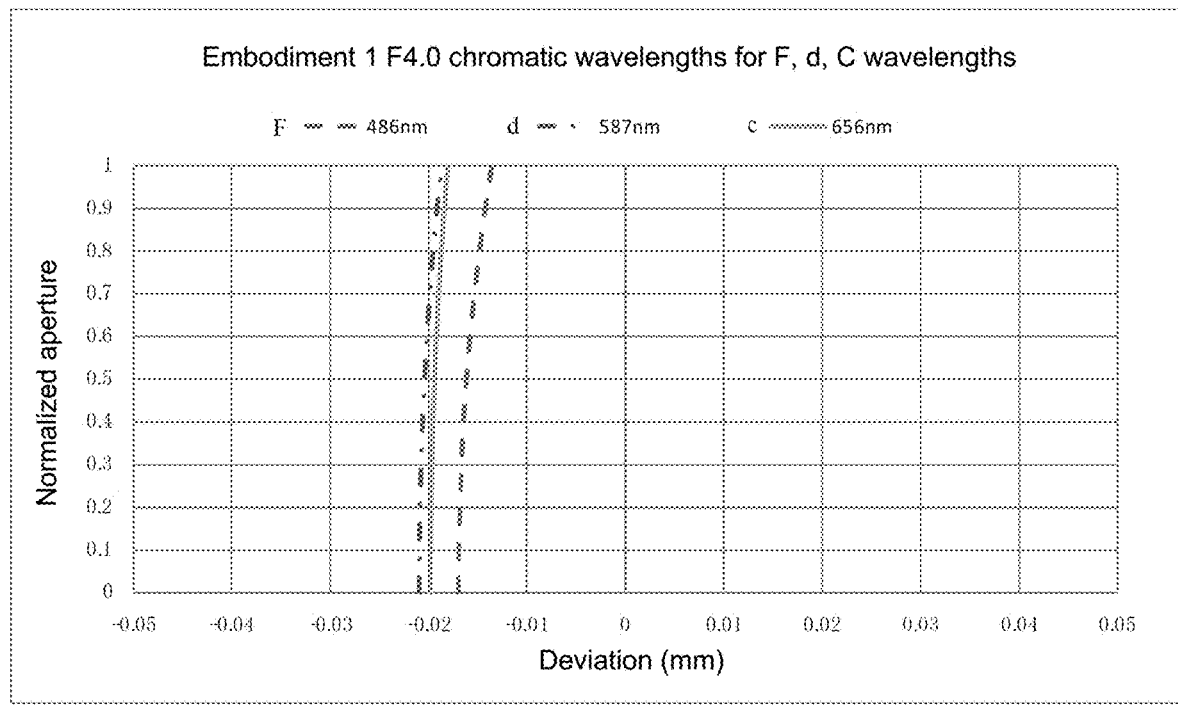
FIG. 5 shows the spherical aberrations of F, d and C wavelengths for f-number F4.0 according to embodiment 1.
Figure 6:
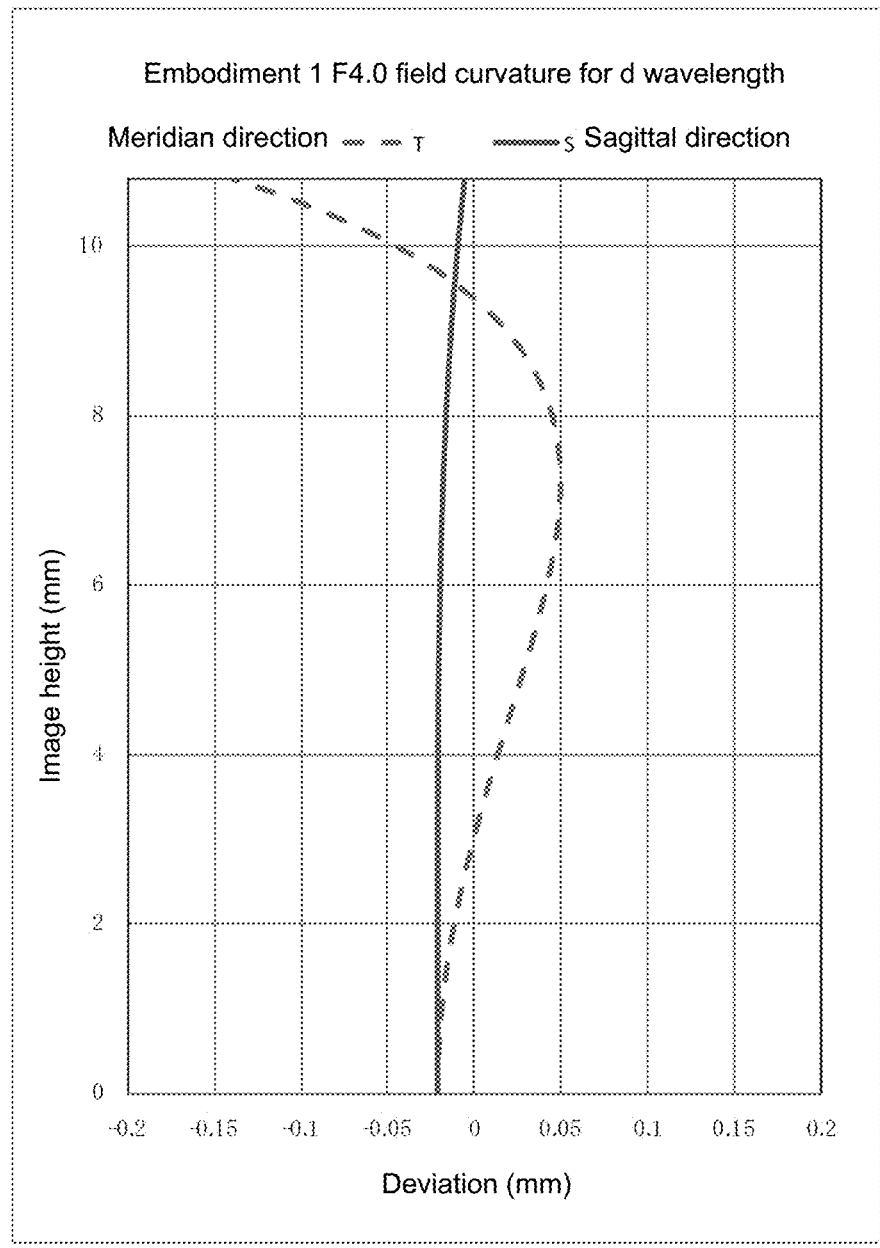
FIG. 6 shows the field curvature of d wavelength for f-number F4.0 according to embodiment 1.
Figure 7:
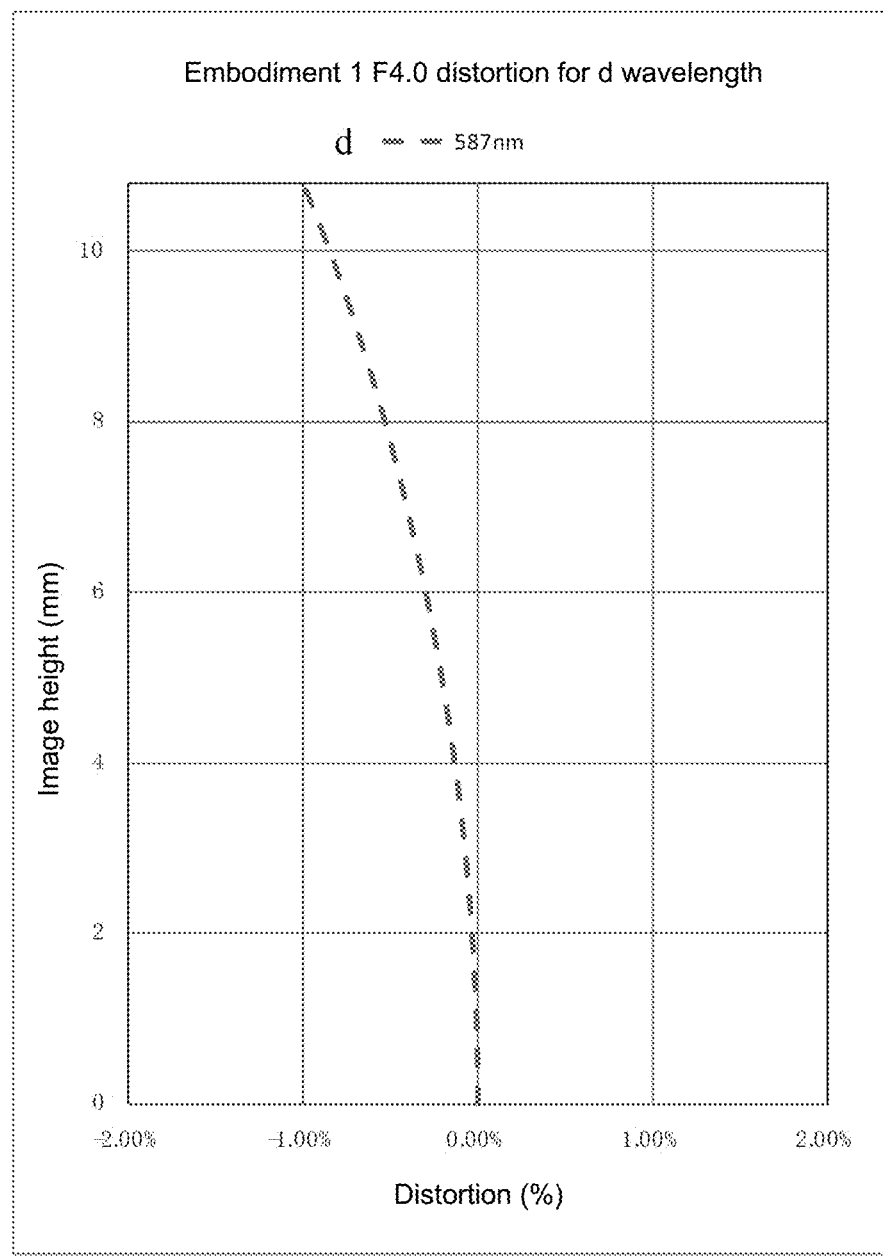
FIG. 7 shows the distortion of d wavelength for f-number F4.0 according to embodiment 1.

FIG. 1 illustrates embodiment 1 of the present invention, comprising a lens attachment of reduced focus and increased light admittance having 71.80 mm focal length and 0.71× magnification; the lens attachment comprises, in a sequential order from an object side to an image side, a first lens element 1 which is a crescent-shape spherical lens having a positive power wherein a front surface of the first lens element 1 is convex (bulging) towards the object side and a rear surface of the first lens element 1 is concave (depressed) towards the object side, a second lens element 2 which is a biconcave spherical lens having a negative power wherein a front surface of the second lens element 2 is concave (depressed) towards the image side and a rear surface of the second lens element 2 is concave (depressed) towards the object side, a third lens element 3 which is a biconvex spherical lens having a positive power wherein a front surface of the third lens element 3 is convex (bulging) towards the object side and a rear surface of the third lens element 3 is convex (bulging) towards the image side, a fourth lens element 4 which is a biconcave spherical lens having a negative power wherein a front surface of the fourth lens element 4 is concave (depressed) towards the image side and a rear surface of the fourth lens element is concave (depressed) towards the object side, and a fifth lens element 5 which is a biconvex spherical lens having a positive power wherein a front surface of the fifth lens element 5 is convex (bulging) towards the object side and a rear surface of the fifth lens element 5 is convex (bulging) towards the image side; the second lens element 2 and the third lens element 3 form a doublet by pairing with each other via adhesive.

An objective lens has a first vertex length; a combination of the lens attachment and the objective lens defines a second vertex length; the second vertex length is shorter than the first vertex length; wherein a "vertex length" represents a length from a vertex of an object-side surface of the objective lens to an image plane. The objective lens is configured as a 35 mm SLR (single-lens reflex) lens. The lens attachment has an object side mounted onto the 35 mm SLR lens and an image side mounted onto an imaging unit. A specification of the imaging unit is selected from the following: M4/3 format, APS-C format, or APS format. The object side of the lens attachment is configured as an interface that is adaptable to the objective lens to be connected. In order to evaluate optical performance, a paraxial lens 6 with a focal length of 100 mm is provided facing towards a side of the lens attachment at a position away from the lens attachment by 66 mm. Although an aperture diaphragm for the lens attachment is configured to align with the paraxial lens 6 for the purpose of evaluating aberrations, it is also possible to move the aperture diaphragm for the lens attachment axially within a wide range of values so that it corresponds to an exit pupil position of the objective lens it is connected to. Embodiment 1 is designed to be compatible with a wide range of objective lens exit pupil distances.

A flat plate 7 parallel to the plane simulates a color filter set in a camera; wherein the color filter set comprises a cover glass, an anti-aliasing filter, and an infrared absorption filter. An image plane 8 is placed approximately 97 mm away from the paraxial lens 6 having a focal length of 100 mm, which means a system comprising the objective lens and the lens attachment has a vertex length 3 mm shorter than that of the objective lens alone. The object-side surface of the second lens element 2 and the image-side surface of the fourth lens element 4 are greatly curved for the beneficial effects of distortion and coma reduction. In the present embodiment, the third lens element 3, the fourth lens element 4, and the fifth lens element 5 are anomalous dispersion lenses to minimize aggravation of chromatic aberration caused by installation of the lens attachment. In case of normal dispersion, the shorter the wavelength, the greater the refractive index, and dispersion (relativity between refractive index and wavelength) dn/dλ<0; in case of anomalous dispersion, the longer the wavelength, the greater the refractive index, and dispersion is greater than 0, that is dn/dλ>0; the above description of dispersion dn/dλ applies to the description below and will not be repeatedly described again.

Embodiment 1 has a magnification of 0.71×, meaning that the focal length is reduced by factor 0.71; also, an aperture ratio of the objective lens is reduced via a full aperture. An image circle of the objective lens is also reduced by factor 0.71, meaning that in order to take full advantage of the Ø 27.6 mm image circle capacity of embodiment 1, the objective lens must have an image circle diameter of at least 27.6/0.71=38.9 mm. Since most of the 35 mm SLR lenses covering the standard 24×36 mm format have at least an image circle diameter of 38.9 mm, it means that a large number of suitable objective lens can be selected for use.

Further, as shown in FIG. 2 to FIG. 7, for F0.9 and F4.0 apertures, axial spherical aberrations produced by the F, d, and C wavelengths are from −0.022 mm to 0.033 mm, astigmatic field curvatures of d wavelength with respect to meridian direction and sagittal direction are from −0.12 mm to 0.05 mm, distortion of d wavelength is from −1% to 0%. Within a field of view of a normalized aperture 0.7, negative spherical aberration of the lens attachment can further reduce the positive spherical aberration originally produced by the lens, also the negative spherical aberration has a certain softening effect on out-of-focus blurring (bokeh). The astigmatic field curvature and distortion are kept small, so as to minimize aggravation of astigmatic field curvature and distortion after the lens attachment is mounted.

Table 1a below shows the compositional data of embodiment 1. Table 1b below shows the specification data of embodiment 1.

TABLE 1a compositional data of embodiment 1

| Surface# | Surface type | Radius of curvature | Thickness | Glass |
|---|---|---|---|---|
| OBJ | | Infinity | Infinity | |
| STO | Perfect lens | Infinity | 66.00 | |
| 2 | Spherical lens | 46.721 | 3.00 | 1.83, 42.7 |
| 3 | Spherical lens | 130.852 | 1.87 | |
| 4 | Spherical lens | −62.123 | 0.80 | 1.60, 46.0 |
| 5 | Spherical lens | 20.054 | 5.10 | 2.02, 28.2 |
| 6 | Spherical lens | −102.089 | 0.15 | |
| 7 | Spherical lens | −127.480 | 0.80 | 1.82, 22.5 |
| 8 | Spherical lens | 22.780 | 2.00 | |
| 9 | Spherical lens | 37.901 | 5.30 | 1.49, 81.6 |
| 10 | Spherical lens | −52.254 | 8.00 | |
| 11 | Flat lens | Infinity | 2.00 | 1.52, 52.2 |
| 12 | Flat lens | Infinity | 2.00 | |
| IMA | | Infinity | | |

TABLE 1b specification data of embodiment 1
Embodiment 1 - Specification

| Focal length | 71.80 mm |
|---|---|
| Magnification | 0.71x |
| Aperture ratio | F/0.90 |
| Diagonal of image | 21.6 mm |
| CvObj2 | −0.016 mm−1 |
| CvIma4 | 0.044 mm−1 |
| (CvObj2 + CvIma4)/φ | 1.997 |
| TL | 19.02 mm |
| TL · φ | 0.265 |

Embodiment 2

Figure 8:
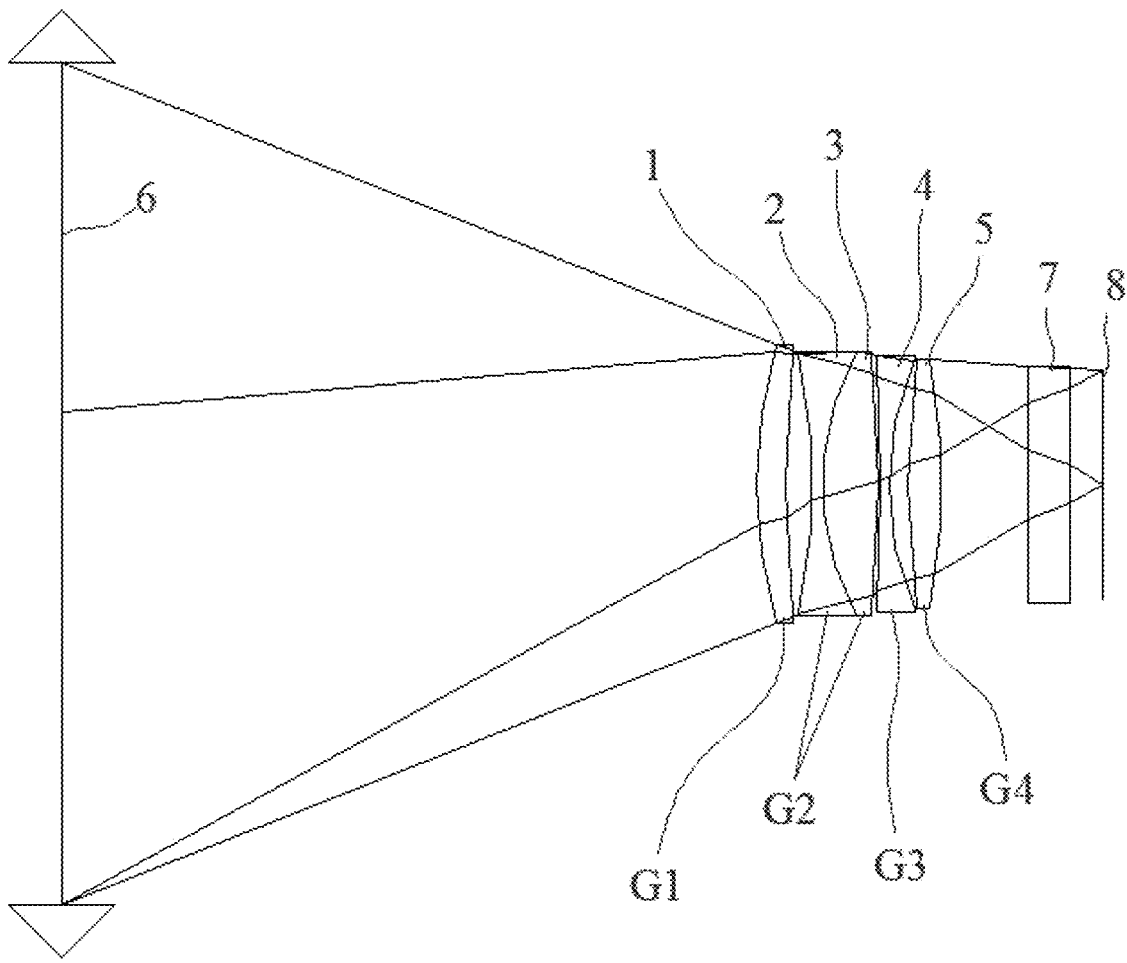
FIG. 8 is a schematic illustration according to embodiment 2.
Figure 9:
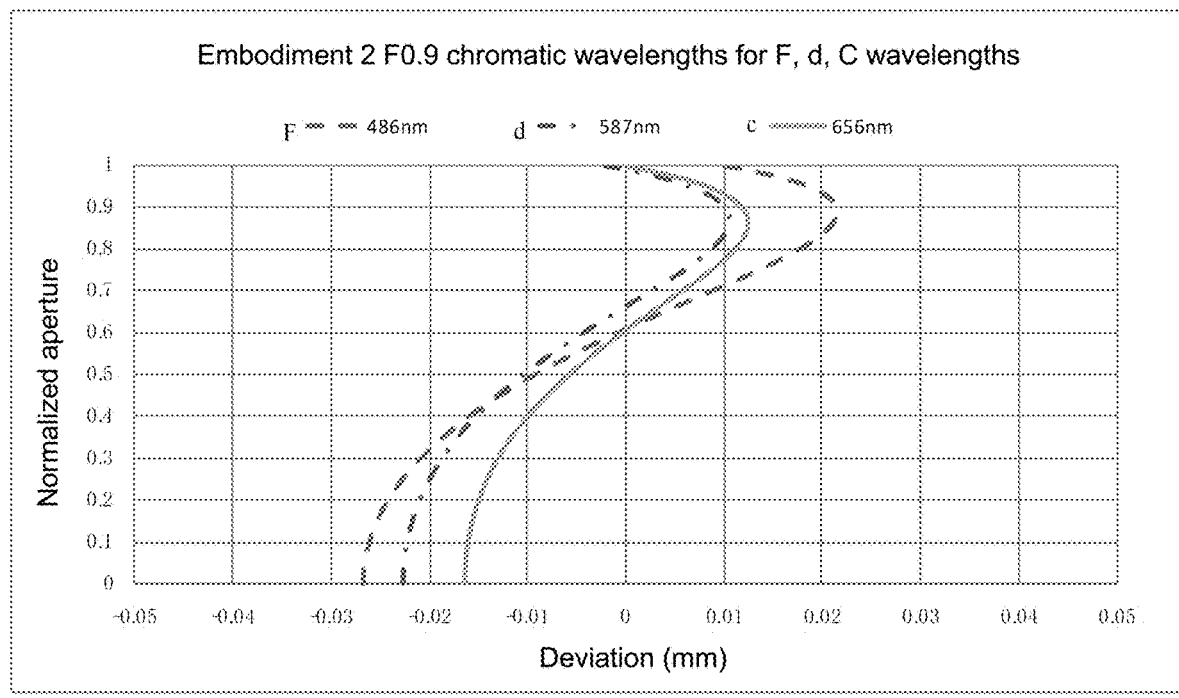
FIG. 9 shows the spherical aberrations of F, d and C wavelengths for f-number F0.9 according to embodiment 2.
Figure 10:
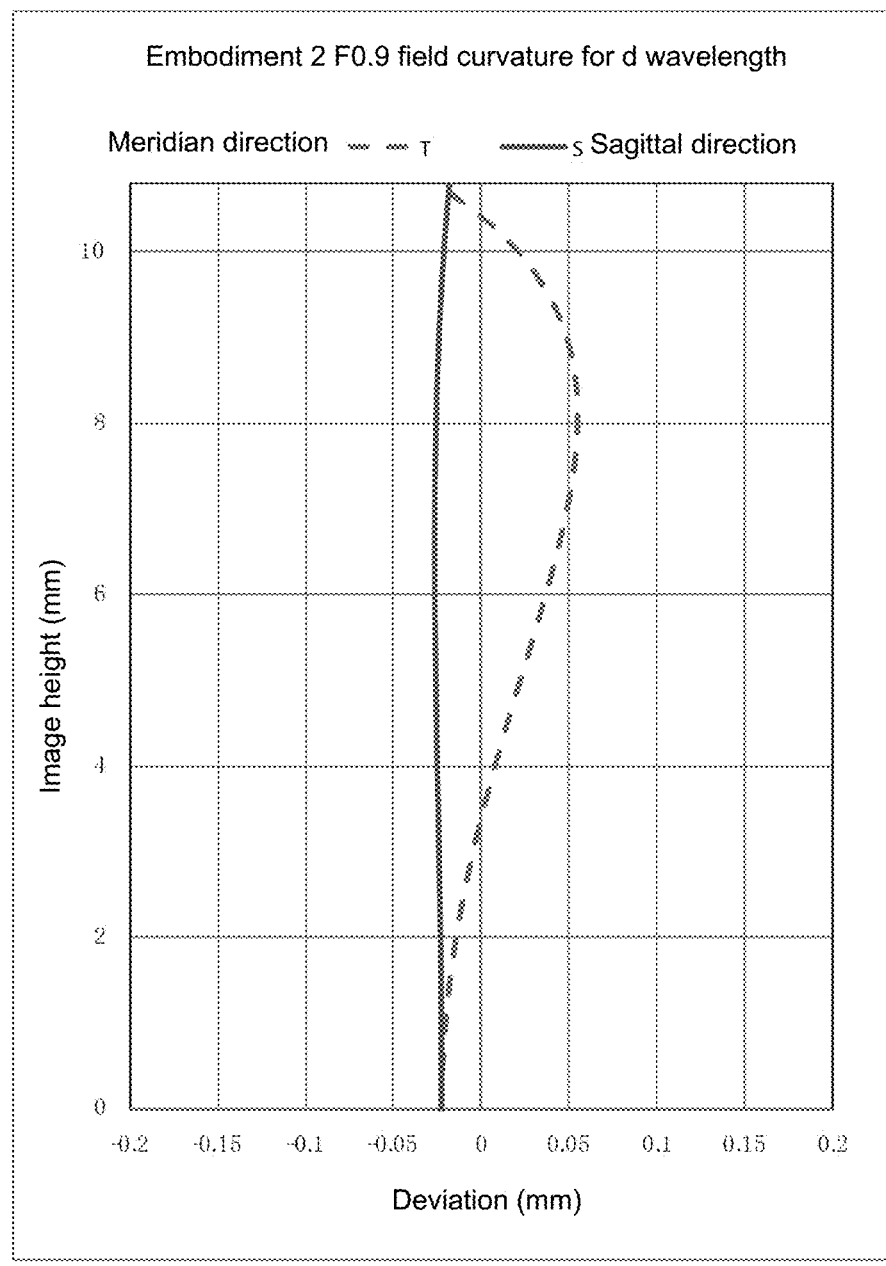
FIG. 10 shows the field curvature of d wavelength for f-number F0.9 according to embodiment 2.
Figure 11:
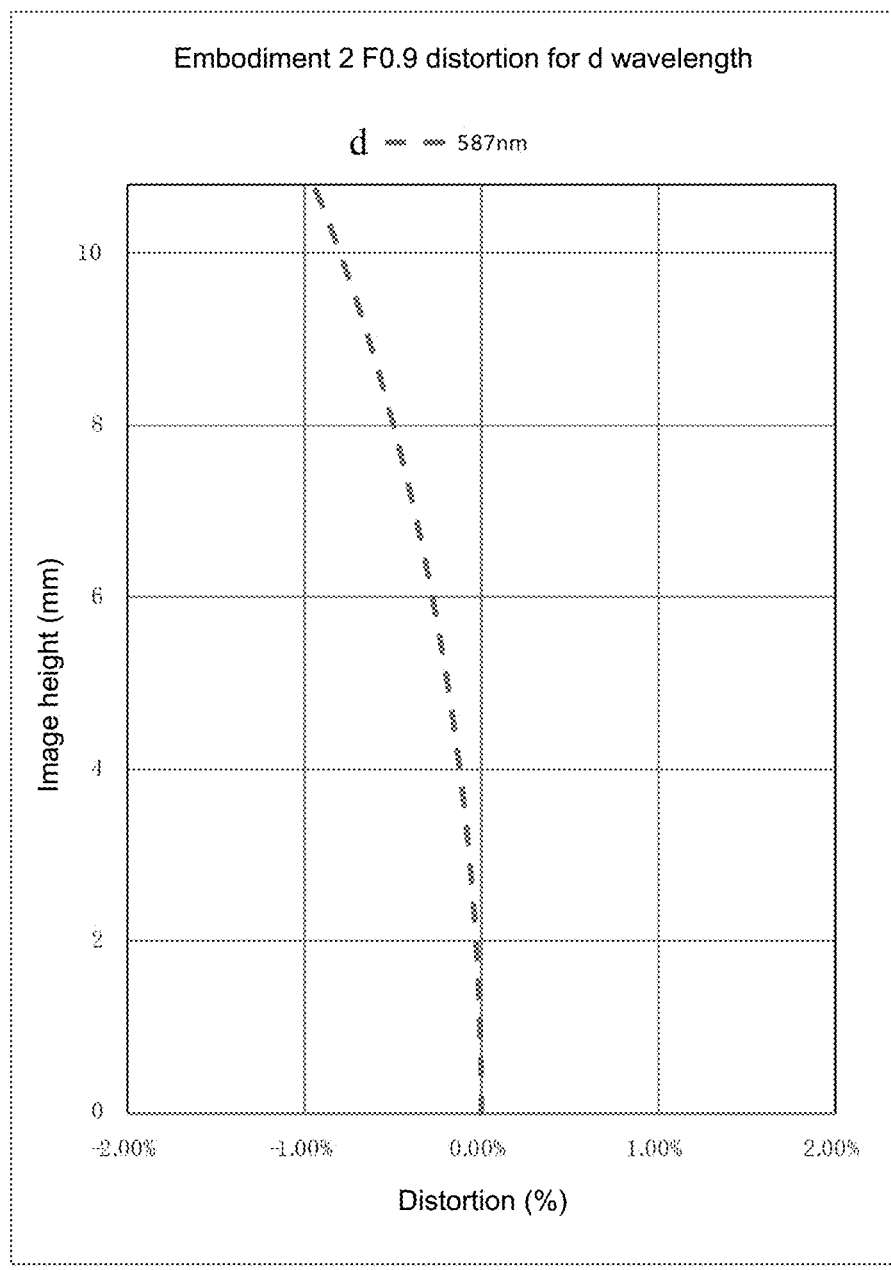
FIG. 11 shows the distortion of d wavelength for f-number F0.9 according to embodiment 2.
Figure 12:
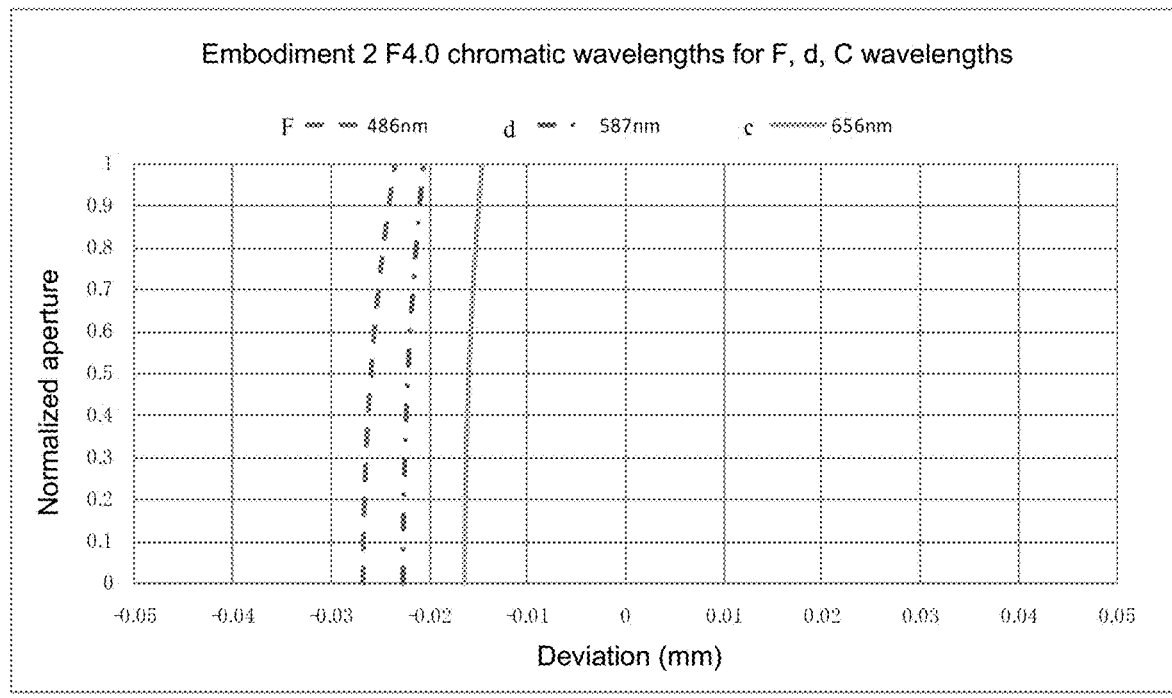
FIG. 12 shows the spherical aberrations of F, d and C wavelengths for f-number F4.0 according to embodiment 2.
Figure 13:
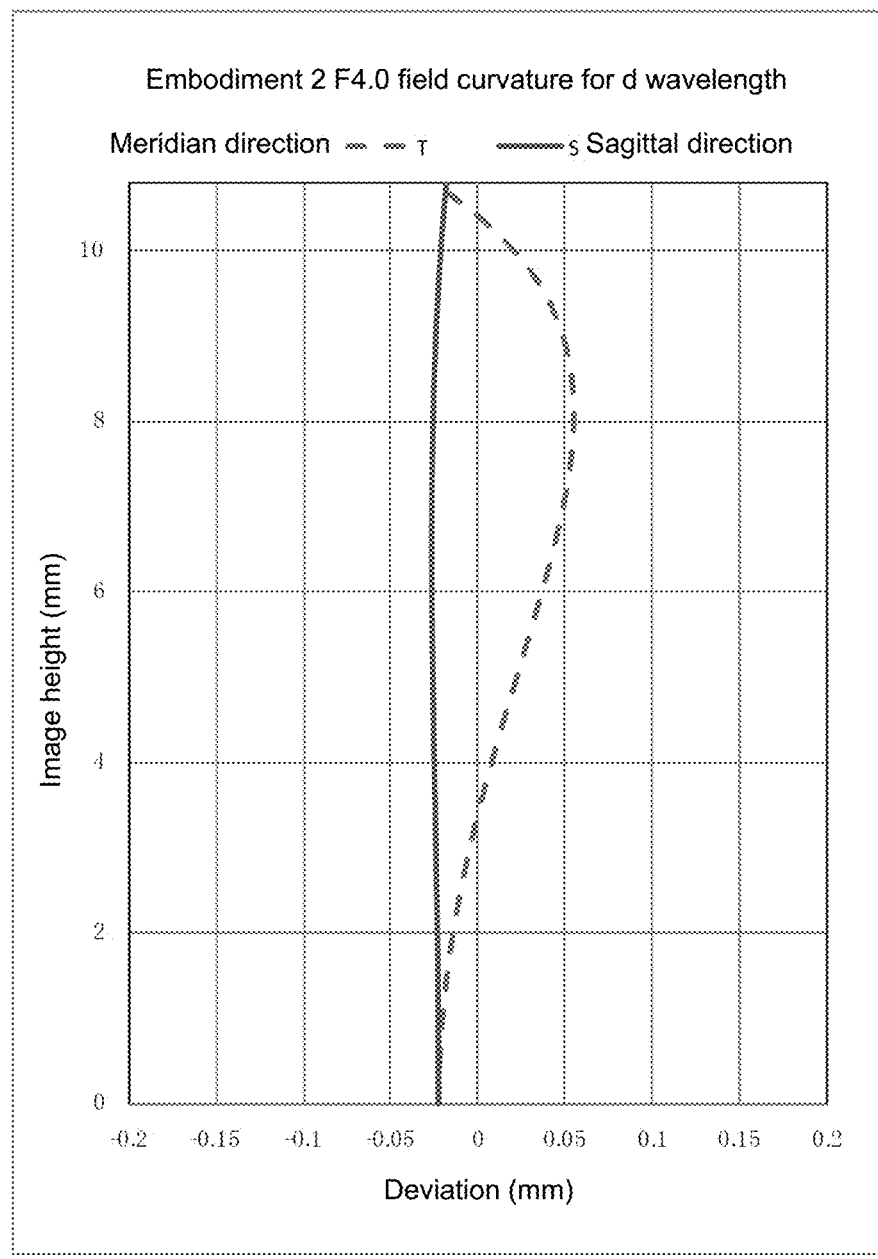
FIG. 13 shows the field curvature of d wavelength for f-number F4.0 according to embodiment 2.
Figure 14:
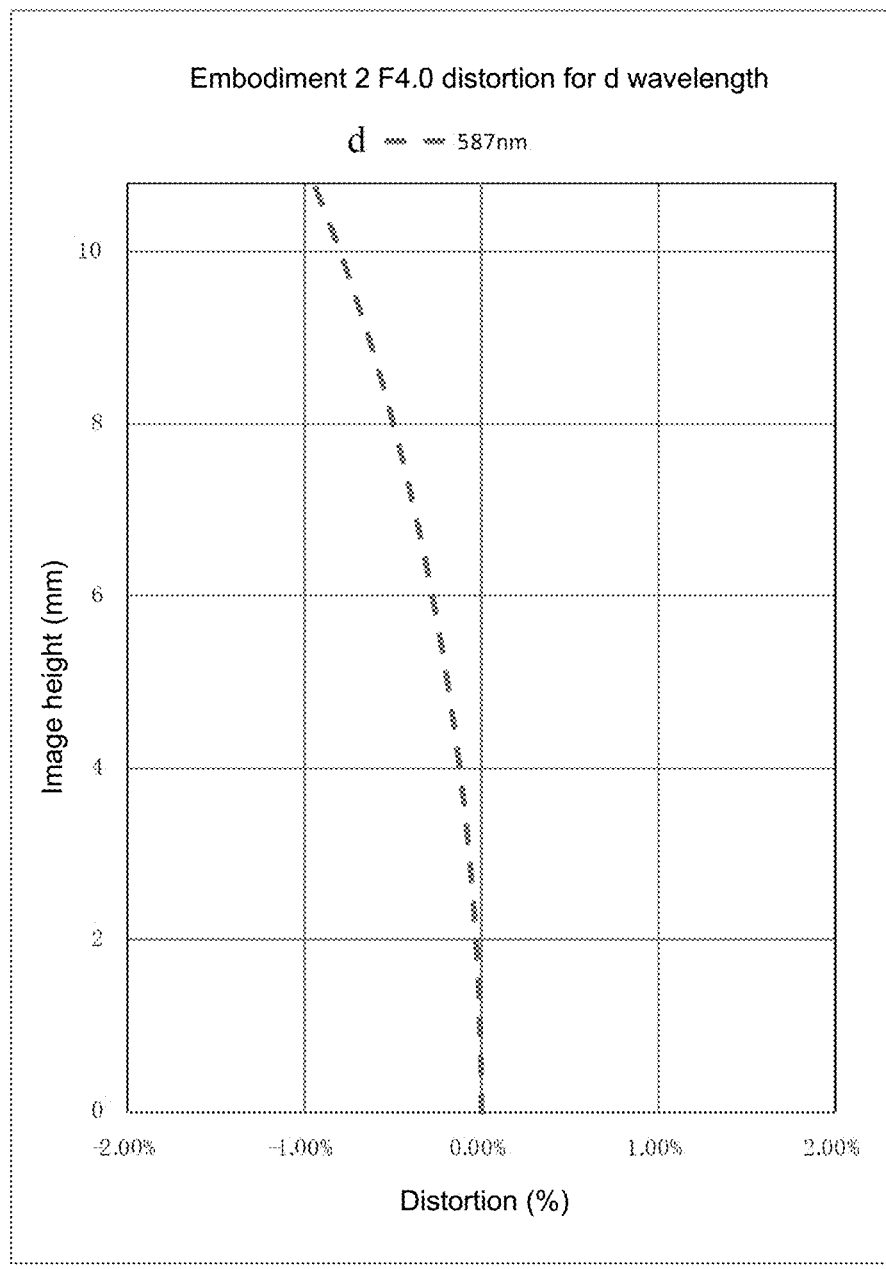
FIG. 14 shows the distortion of d wavelength for f-number F4.0 according to embodiment 2.

FIG. 8 illustrates embodiment 2 of the present invention, comprising a lens attachment of reduced focus and increased light admittance having 70.99 mm focal length and 0.71× magnification; the lens attachment comprises, in a sequential order from an object side to an image side, a first lens element 1 which is a crescent-shape spherical lens having a positive power wherein a front surface of the first lens element 1 is convex (bulging) towards the object side and a rear surface of the first lens element 1 is concave (depressed) towards the object side, a second lens element 2 which is a biconcave spherical lens having a negative power wherein a front surface of the second lens element 2 is concave (depressed) towards the image side and a rear surface of the second lens element 2 is concave (depressed) towards the object side, a third lens element 3 which is a biconvex spherical lens having a positive power wherein a front surface of the third lens element 3 is convex (bulging) towards the object side and a rear surface of the third lens element 3 is convex (bulging) towards the image side, a fourth lens element 4 which is a biconcave spherical lens having a negative power wherein a front surface of the fourth lens element 4 is concave (depressed) towards the image side and a rear surface of the fourth lens element is concave (depressed) towards the object side, and a fifth lens element 5 which is a biconvex spherical lens having a positive power wherein a front surface of the fifth lens element 5 is convex (bulging) towards the object side and a rear surface of the fifth lens element 5 is convex (bulging) towards the image side; the second lens element 2 and the third lens element 3 form a doublet by pairing with each other via adhesive.

An objective lens has a first vertex length; a combination of the lens attachment and the objective lens defines a second vertex length; the second vertex length is shorter than the first vertex length; wherein a "vertex length" represents a length from a vertex of an object-side surface of the objective lens to an image plane. The objective lens is configured as a 35 mm SLR (single-lens reflex) lens. The lens attachment has an object side mounted onto the 35 mm SLR lens and an image side mounted onto an imaging unit. A specification of the imaging unit is selected from the following: M4/3 format, APS-C format, or APS format. The object side of the lens attachment is configured as an interface that is adaptable to the objective lens to be connected. In order to evaluate optical performance, a paraxial lens 6 with a focal length of 100 mm is provided facing towards a side of the lens attachment at a position away from the lens attachment by 65 mm. Although an aperture diaphragm for the lens attachment is configured to align with the paraxial lens 6 for the purpose of evaluating aberrations, it is also possible to move the aperture diaphragm for the lens attachment axially within a wide range of values so that it corresponds to an exit pupil position of the objective lens it is connected to. Embodiment 2 is designed to be compatible with a wide range of objective lens exit pupil distances.

A flat plate 7 parallel to the plane simulates a color filter set in a camera; wherein the color filter set comprises a cover glass, an anti-aliasing filter, and an infrared absorption filter. An image plane 8 is placed approximately 97.46 mm away from the paraxial lens 6 having a focal length of 100 mm, which means a system comprising the objective lens and the lens attachment has a vertex length 2.54 mm shorter than that of the objective lens alone. The object-side surface of the second lens element 2 and the image-side surface of the fourth lens element 4 are greatly curved for the beneficial effects of distortion and coma reduction. A higher reflective index of the first lens element 1 together with strong power facilitate length compression of the system. Also, the third lens element 3 and the fourth lens element 4 are anomalous dispersion lenses to minimize aggravation of chromatic aberration caused by installation of the lens attachment.

Embodiment 2 has a magnification of 0.71×, meaning that the focal length is reduced by factor 0.71; also, an aperture ratio of the objective lens is reduced via a full aperture. An image circle of the objective lens is also reduced by factor 0.71, meaning that in order to take full advantage of the Ø 27.6 mm image circle capacity of embodiment 2, the objective lens must have an image circle diameter of at least 27.6/0.71=38.9 mm. Since most of the 35 mm SLR lenses covering the standard 24×36 mm format have at least an image circle diameter of 38.9 mm, it means that a large number of suitable objective lens can be selected for use.

Further, as shown in FIG. 9 to FIG. 14, for F0.9 and F4.0 apertures, axial spherical aberrations produced by the F, d, and C wavelengths are from −0.03 mm to 0.023 mm, astigmatic field curvatures of d wavelength with respect to meridian direction and sagittal direction are from −0.05 mm to 0.052 mm, distortion of d wavelength is from −1% to 0%. Within a field of view of a normalized aperture 0.6, negative spherical aberration of the lens attachment can further reduce the positive spherical aberration originally produced by the lens, also the negative spherical aberration has a certain softening effect on out-of-focus blurring (bokeh). The astigmatic field curvature and distortion are kept small, so as to minimize aggravation of astigmatic field curvature and distortion after the lens attachment is mounted.

Table 2a below shows the compositional data of embodiment 2. Table 2b below shows the specification data of embodiment 2.

TABLE 2a compositional data of embodiment 2

| Surface# | Surface type | Radius of curvature | Thickness | Glass |
|---|---|---|---|---|
| OBJ |  | Infinity | Infinity |  |
| STO | Perfect lens | Infinity | 65.00 |  |
| 2 | Spherical lens | 46.711 | 2.76 | 1.83, 42.7 |
| 3 | Spherical lens | 149.852 | 2.5 |  |
| 4 | Spherical lens | −60.123 | 0.80 | 1.60, 46.0 |
| 5 | Spherical lens | 23.054 | 5.30 | 2.02, 28.2 |
| 6 | Spherical lens | −105.089 | 0.10 |  |
| 7 | Spherical lens | −227.480 | 0.80 | 1.82, 22.5 |
| 8 | Spherical lens | 28.780 | 2.00 |  |
| 9 | Spherical lens | 84.901 | 3.20 | 1.55, 61.6 |
| 10 | Spherical lens | −58.254 | 8.00 |  |
| 11 | Flat lens | Infinity | 4.00 | 1.52, 52.2 |
| 12 | Flat lens | Infinity | 3.00 |  |
| IMA |  | Infinity |  |  |

TABLE 2b specification data of embodiment 2
Embodiment 2 - Specification

| Focal length | 70.99 mm |
|---|---|
| Magnification | 0.71x |
| Aperture ratio | F/0.90 |
| Diagonal of image | 21.6 mm |
| CvObj2 | −0.017 mm−1 |
| CvIma4 | 0.035 mm−1 |
| (CvObj2 + CvIma4)/φ | 1.285 |
| TL | 17.46 mm |
| TL · φ | 0.246 |

Embodiment 3

Figure 15:
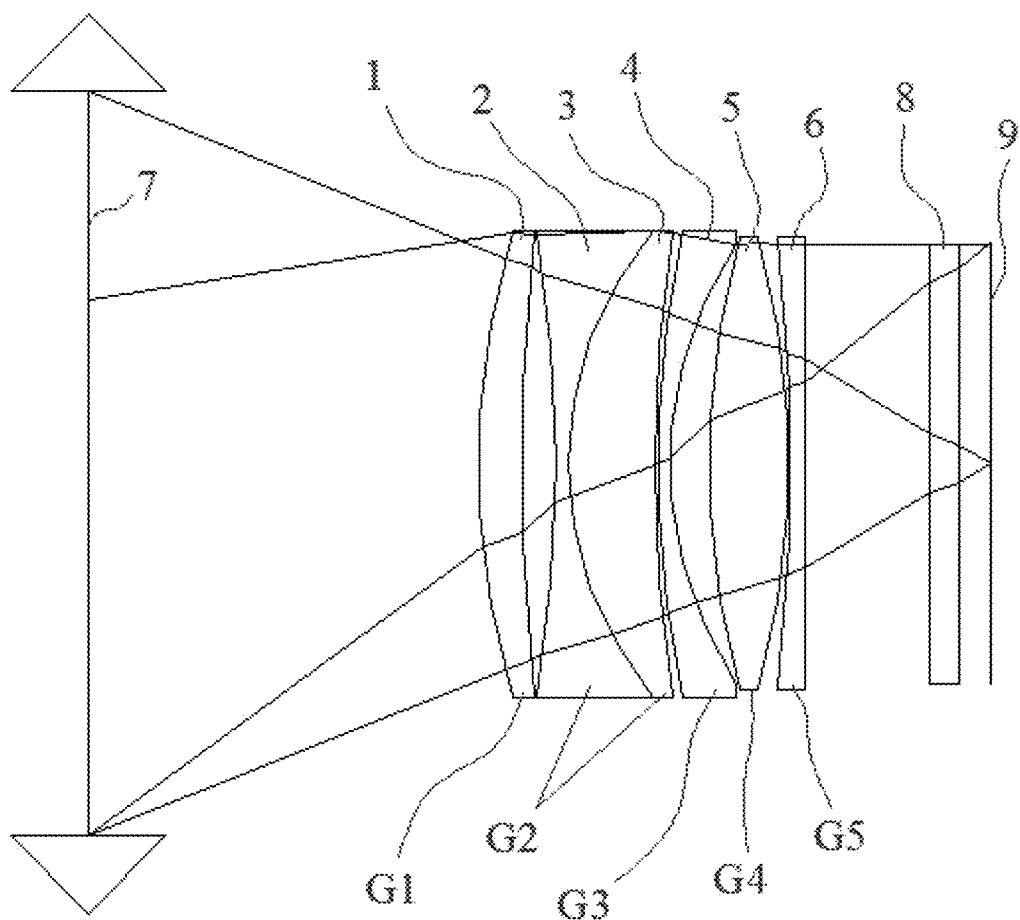
FIG. 15 is a schematic illustration according to embodiment 3.
Figure 16:
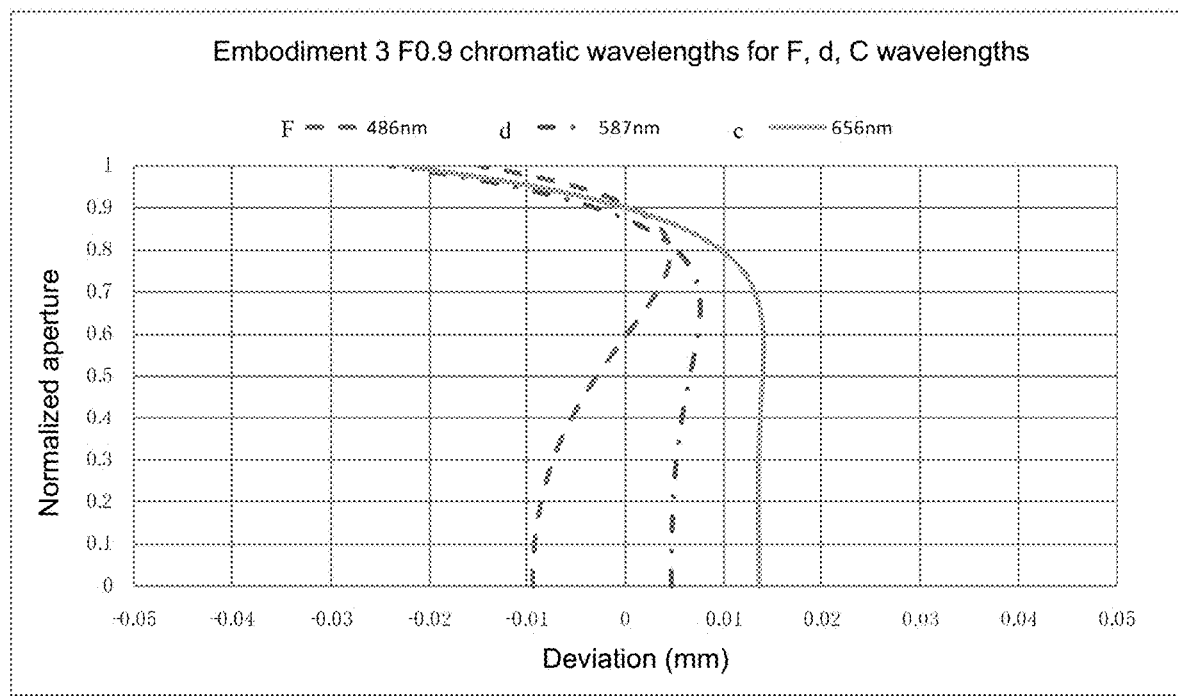
FIG. 16 shows the spherical aberrations of F, d and C wavelengths for f-number F0.9 according to embodiment 3.
Figure 17:
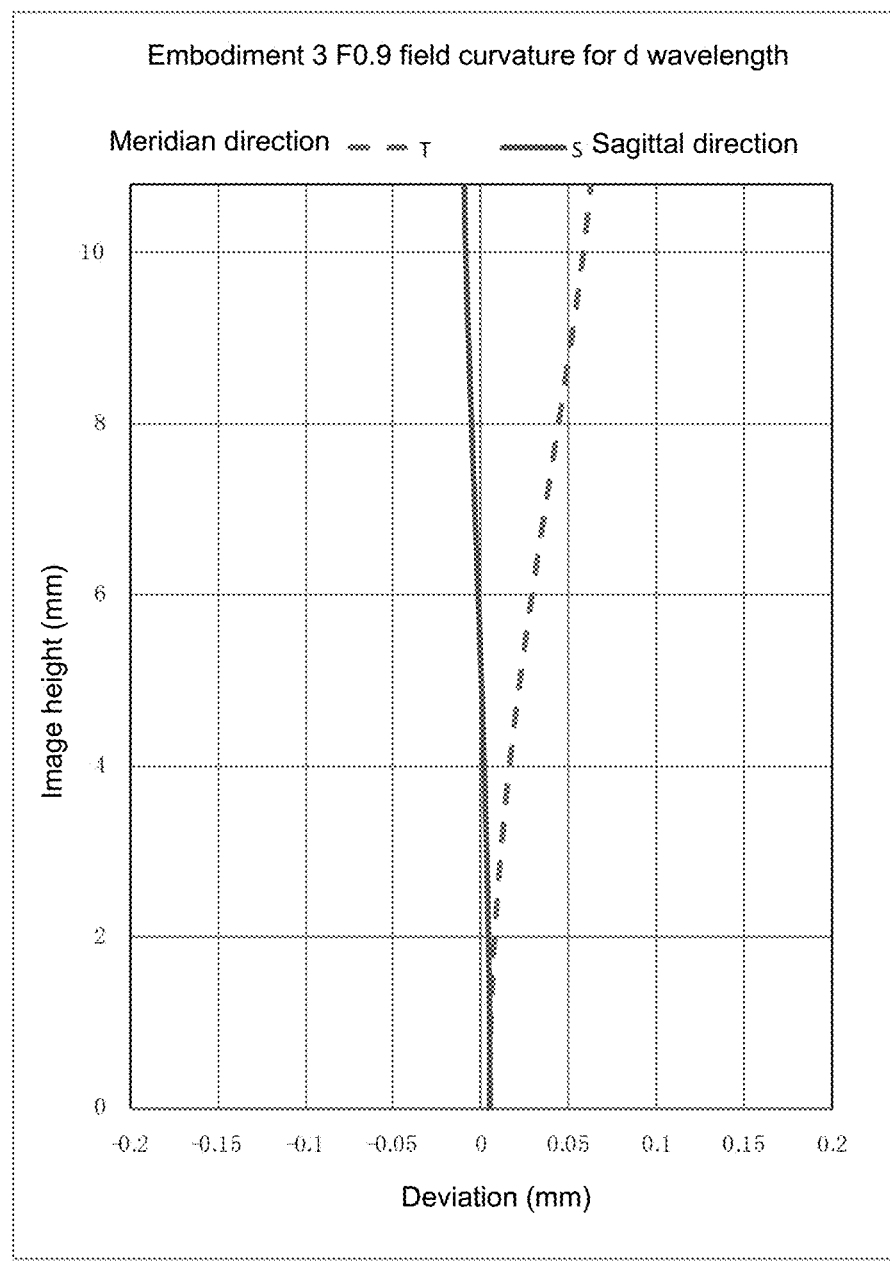
FIG. 17 shows the field curvature of d wavelength for f-number F0.9 according to embodiment 3.
Figure 18:
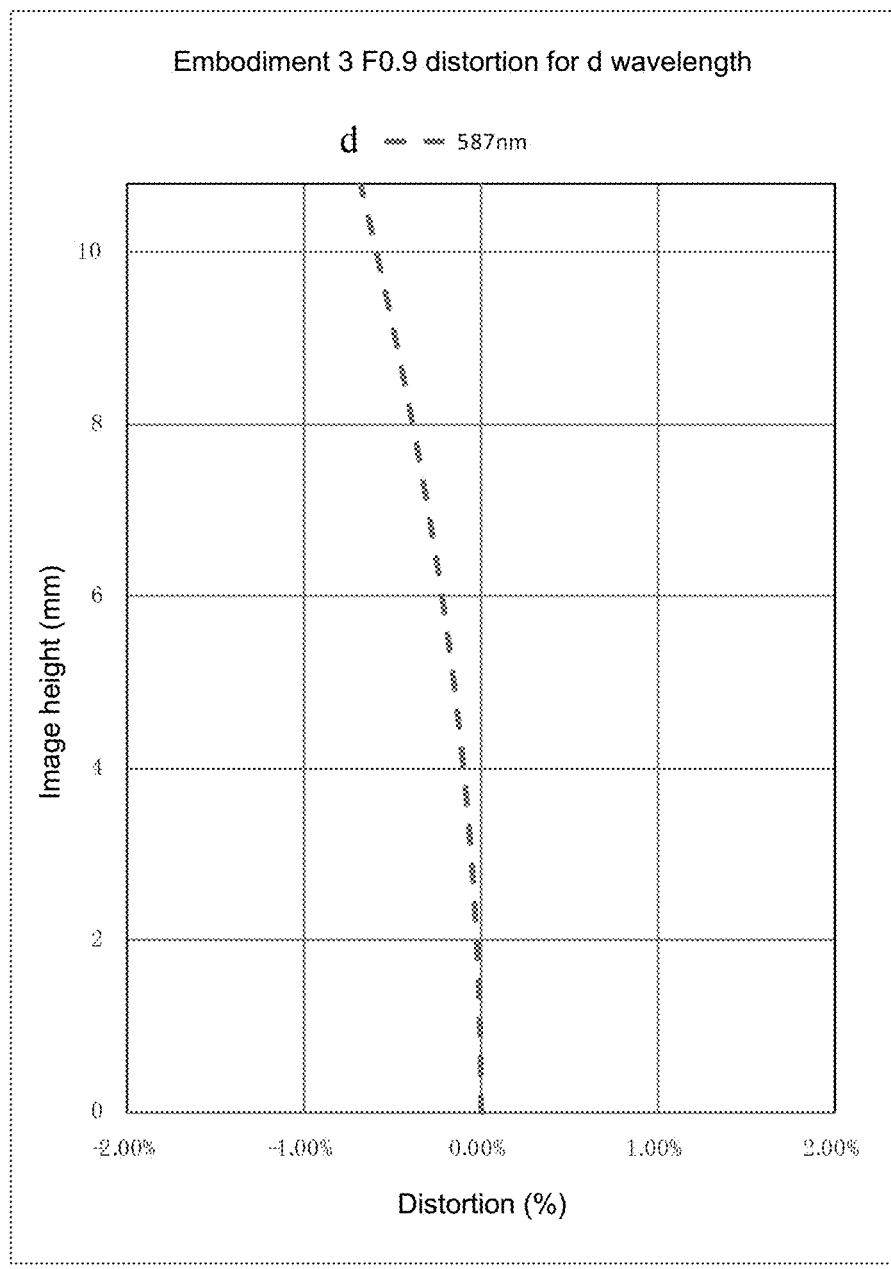
FIG. 18 shows the distortion of d wavelength for f-number F0.9 according to embodiment 3.
Figure 19:
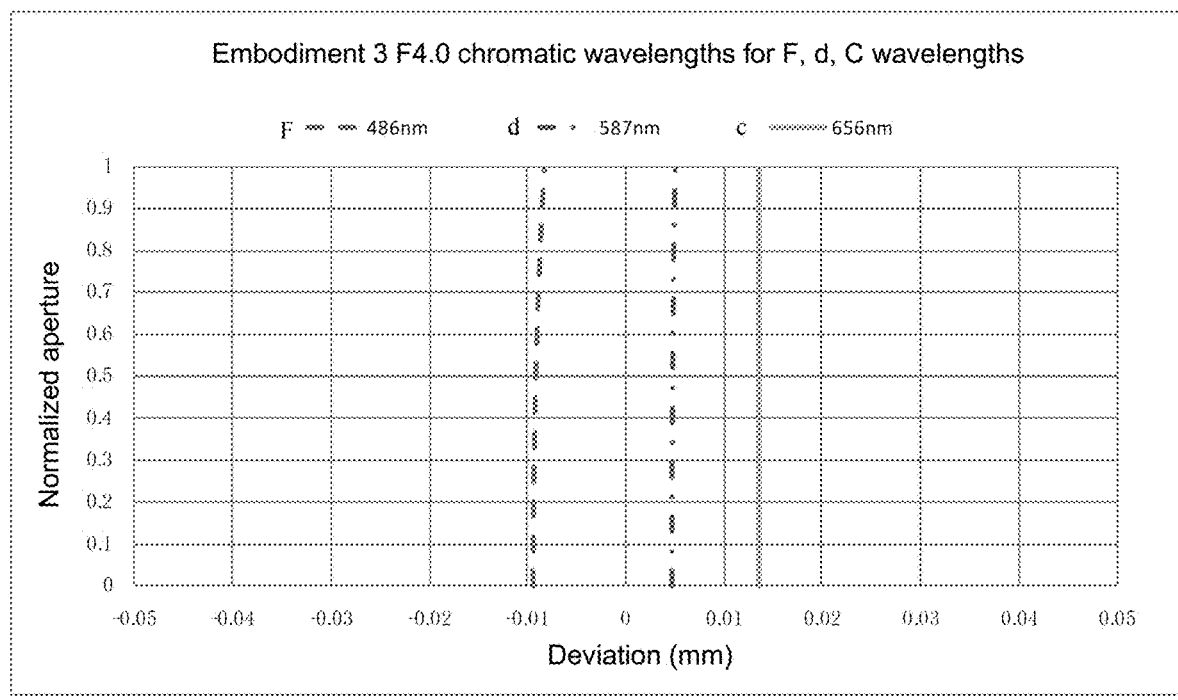
FIG. 19 shows the spherical aberrations of F, d and C wavelengths for f-number F4.0 according to embodiment 3.
Figure 20:
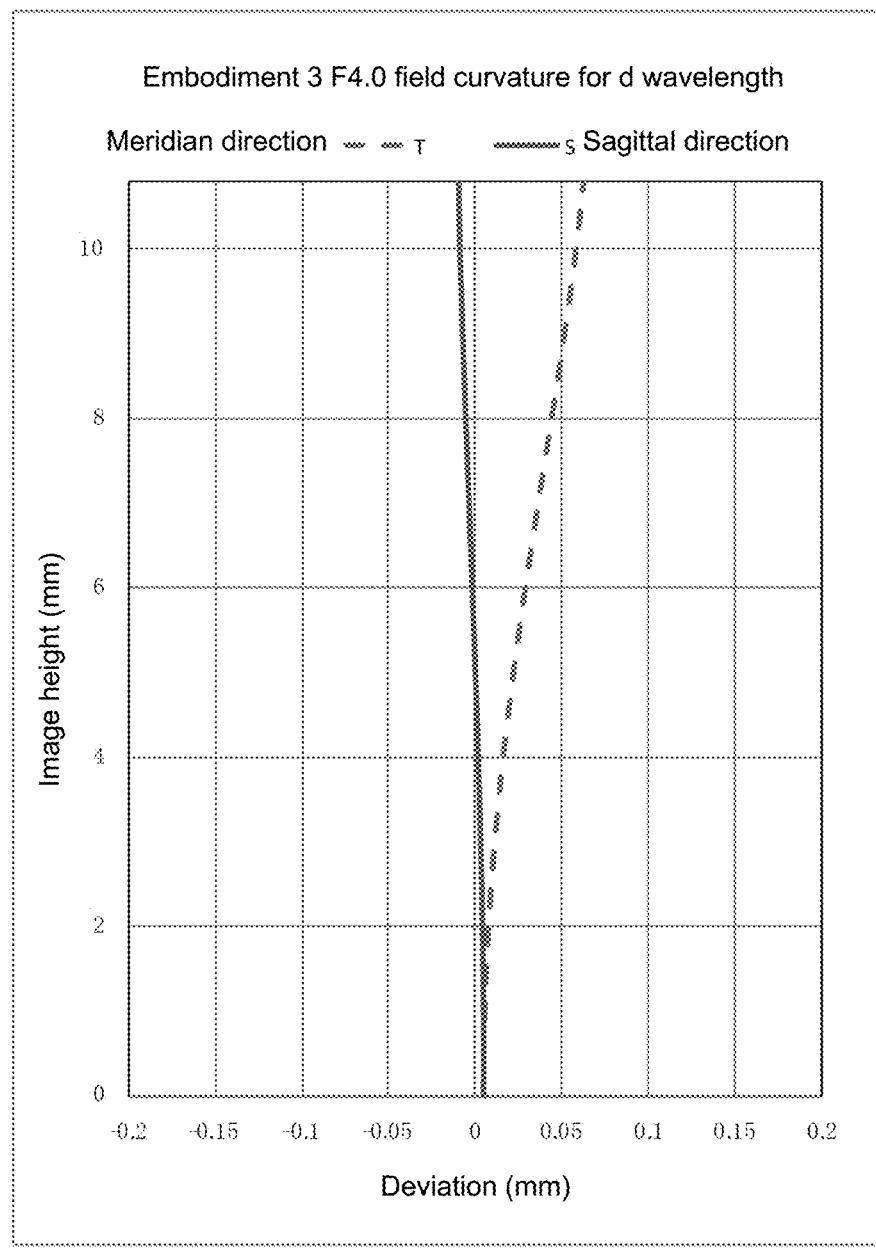
FIG. 20 shows the field curvature of d wavelength for f-number F4.0 according to embodiment 3.
Figure 21:
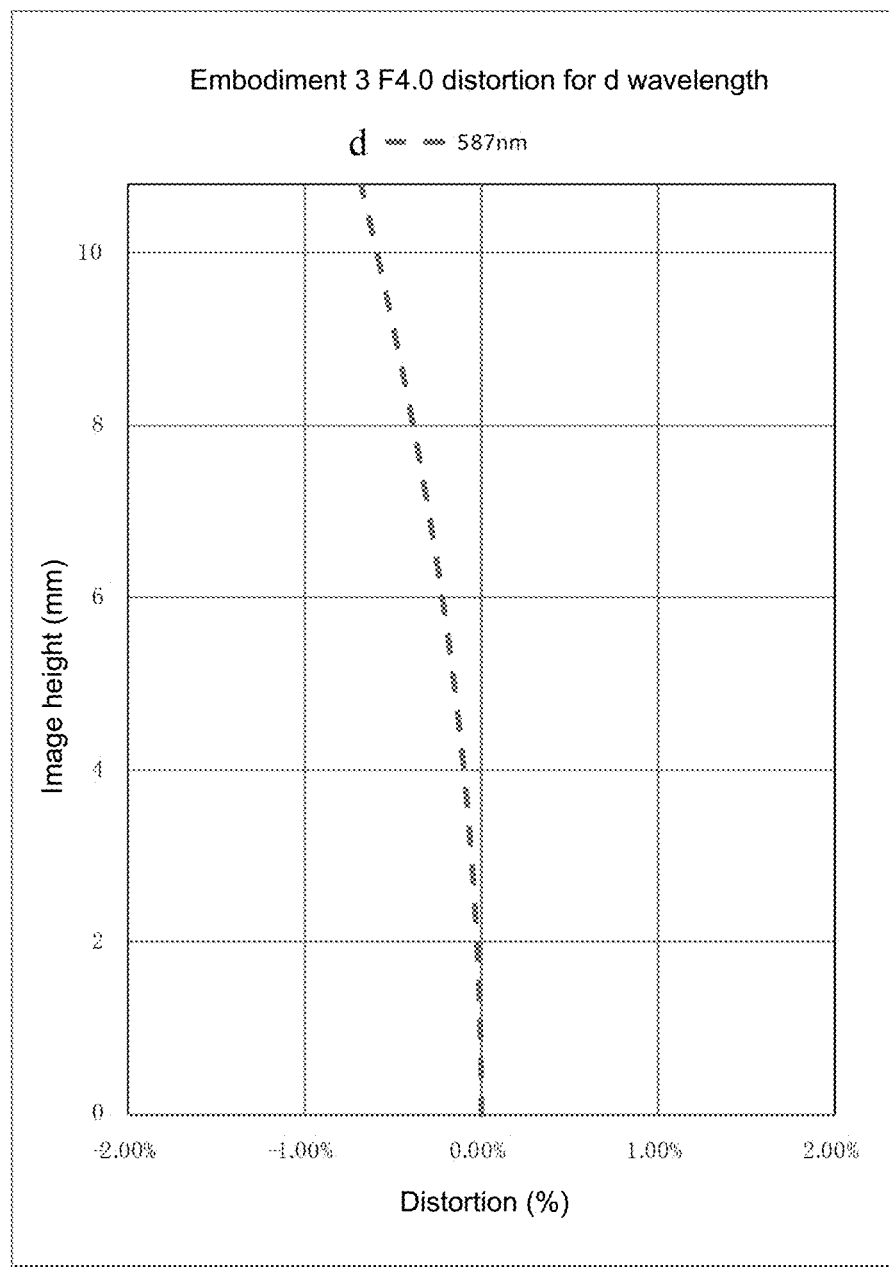
FIG. 21 shows the distortion of d wavelength for f-number F4.0 according to embodiment 3.

FIG. 15 illustrates embodiment 3 of the present invention, comprising a lens attachment of reduced focus and increased light admittance having 85.65 mm focal length and 0.71× magnification; the lens attachment comprises, in a sequential order from an object side to an image side, a first lens element 1 which is a crescent-shape spherical lens having a positive power wherein a front surface of the first lens element 1 is convex (bulging) towards the object side and a rear surface of the first lens element 1 is concave (depressed) towards the object side, a second lens element 2 which is a biconcave spherical lens having a negative power wherein a front surface of the second lens element 2 is concave (depressed) towards the image side and a rear surface of the second lens element 2 is concave (depressed) towards the object side, a third lens element 3 which is a biconvex spherical lens having a positive power wherein a front surface of the third lens element 3 is convex (bulging) towards the object side and a rear surface of the third lens element 3 is convex (bulging) towards the image side, a fourth lens element 4 which is a biconcave spherical lens having a negative power wherein a front surface of the fourth lens element 4 is concave (depressed) towards the image side and a rear surface of the fourth lens element is concave (depressed) towards the object side, a fifth lens element 5 which is a biconvex spherical lens having a positive power wherein a front surface of the fifth lens element 5 is convex (bulging) towards the object side and a rear surface of the fifth lens element 5 is convex (bulging) towards the image side, and a sixth lens element 6 which is a biconcave spherical lens having a negative power wherein a front surface of the sixth lens element 6 is concave (depressed) towards the image side and a rear surface of the sixth lens element 6 is concave (depressed) towards the object side; the second lens element 2 and the third lens element 3 form a doublet by pairing with each other via adhesive; the sixth lens element 6 is positioned at a side of the fifth lens elements away from the image side.

An objective lens has a first vertex length; a combination of the lens attachment and the objective lens defines a second vertex length; the second vertex length is shorter than the first vertex length; wherein a "vertex length" represents a length from a vertex of an object-side surface of the objective lens to an image plane. The objective lens is configured as a 35 mm SLR (single-lens reflex) lens. The lens attachment has an object side mounted onto the 35 mm SLR lens and an image side mounted onto an imaging unit. A specification of the imaging unit is selected from the following: M4/3 format, APS-C format, or APS format. The object side of the lens attachment is configured as an interface that is adaptable to the objective lens to be connected. In order to evaluate optical performance, a paraxial lens 7 with a focal length of 60 mm is provided facing towards a side of the lens attachment at a position away from the lens attachment by 25 mm. Although an aperture diaphragm for the lens attachment is configured to align with the paraxial lens 7 for the purpose of evaluating aberrations, it is also possible to move the aperture diaphragm for the lens attachment axially within a wide range of values so that it corresponds to an exit pupil position of the objective lens it is connected to. Embodiment 3 is designed to be compatible with a wide range of objective lens exit pupil distances.

A flat plate 8 parallel to the plane simulates a color filter set in a camera; wherein the color filter set comprises a cover glass, an anti-aliasing filter, and an infrared absorption filter. An image plane 9 is placed approximately 58 mm away from the paraxial lens 7 having a focal length of 60 mm, which means a system comprising the objective lens and the lens attachment has a vertex length 2 mm shorter than that of the objective lens alone. The first lens element 1 and the third lens element 3 are both made of flint glass with high reflective index, also, minimized aberration together with strong power maintain the system as compact as possible. Further, the third lens element 3 and the fifth lens element 5 are anomalous dispersion lenses made of dense flint glass with high reflective index to minimize aggravation of chromatic aberration.

Embodiment 3 has a magnification of 0.71×, meaning that the focal length is reduced by factor 0.71; also, an aperture ratio of the objective lens is reduced via a full aperture. An image circle of the objective lens is also reduced by factor 0.71, meaning that in order to take full advantage of the Ø 28.2 mm image circle capacity of embodiment 3, the objective lens must have an image circle diameter of at least 28.2/0.71=39.72 mm. Since most of the 35 mm SLR lenses covering the standard 24×36 mm format have at least an image circle diameter of 43.27 mm, it means that a large number of suitable objective lens can be selected for use.

Further, as shown in FIG. 16 to FIG. 21, for F0.9 and F4.0 apertures, axial spherical aberrations produced by the F, d, and C wavelengths are from −0.025 mm to 0.015 mm, astigmatic field curvatures of d wavelength with respect to meridian direction and sagittal direction are from −0.015 mm to 0.055 mm, distortion of d wavelength is from −0.7% to 0%. Within a peripheral field of view, negative spherical aberration of the lens attachment can further offset the positive spherical aberration originally produced by the camera objective lens at the peripheral field of view, so as to minimize aggravation of chromatic aberration of the system after the lens attachment is mounted. The astigmatic field curvature and distortion are kept small, so as to minimize aggravation of astigmatic field curvature and distortion after the lens attachment is mounted.

Table 3a below shows the compositional data of embodiment 3. Table 3b below shows the specification data of embodiment 3.

TABLE 3a compositional data of embodiment 3

| Surface# | Surface type | Radius of curvature | Thickness | Glass |
|---|---|---|---|---|
| OBJ | | Infinity | Infinity | |
| STO | Perfect lens | Infinity | 25.00 | |
| 2 | Spherical lens | 50.468 | 3.91 | 1.98, 24.3 |
| 3 | Spherical lens | 171.554 | 1.90 | |
| 4 | Spherical lens | −86.563 | 0.80 | 1.50, 66.1 |
| 5 | Spherical lens | 27.498 | 1.46 | 1.78, 27.6 |

TABLE 3a-continued compositional data of embodiment 3

| Surface# | Surface type | Radius of curvature | Thickness | Glass |
|---|---|---|---|---|
| 6 | Spherical lens | 103.661 | 4.6 | |
| 7 | Spherical lens | 67.826 | 0.80 | 1.88, 23.2 |
| 8 | Spherical lens | 24.474 | 1.09 | |
| 9 | Spherical lens | 54.495 | 4.42 | 1.75, 55.4 |
| 10 | Spherical lens | −55.495 | 0.15 | |
| 11 | Spherical lens | −116.628 | 0.8 | 1.93, 17.9 |
| 12 | Spherical lens | 302.254 | 8.00 | |
| 13 | Flat lens | Infinity | 2.0 | 1.52, 52.2 |
| 14 | Flat lens | Infinity | 2.0 | |
| IMA | | Infinity | | |

TABLE 3b specification data of embodiment 3
Embodiment 3 - Specification

| Focal length | 85.65 mm |
|---|---|
| Magnification | 0.71x |
| Aperture ratio | F/0.90 |
| Diagonal of image | 28.4 mm |
| CvObj2 | −0.011 mm−1 |
| CvIma4 | 0.039 mm−1 |
| (CvObj2 + CvIma4)/φ | 2.510 |
| TL | 19.93 mm |
| TL · φ | 0.232 |

Embodiment 4

Figure 22:
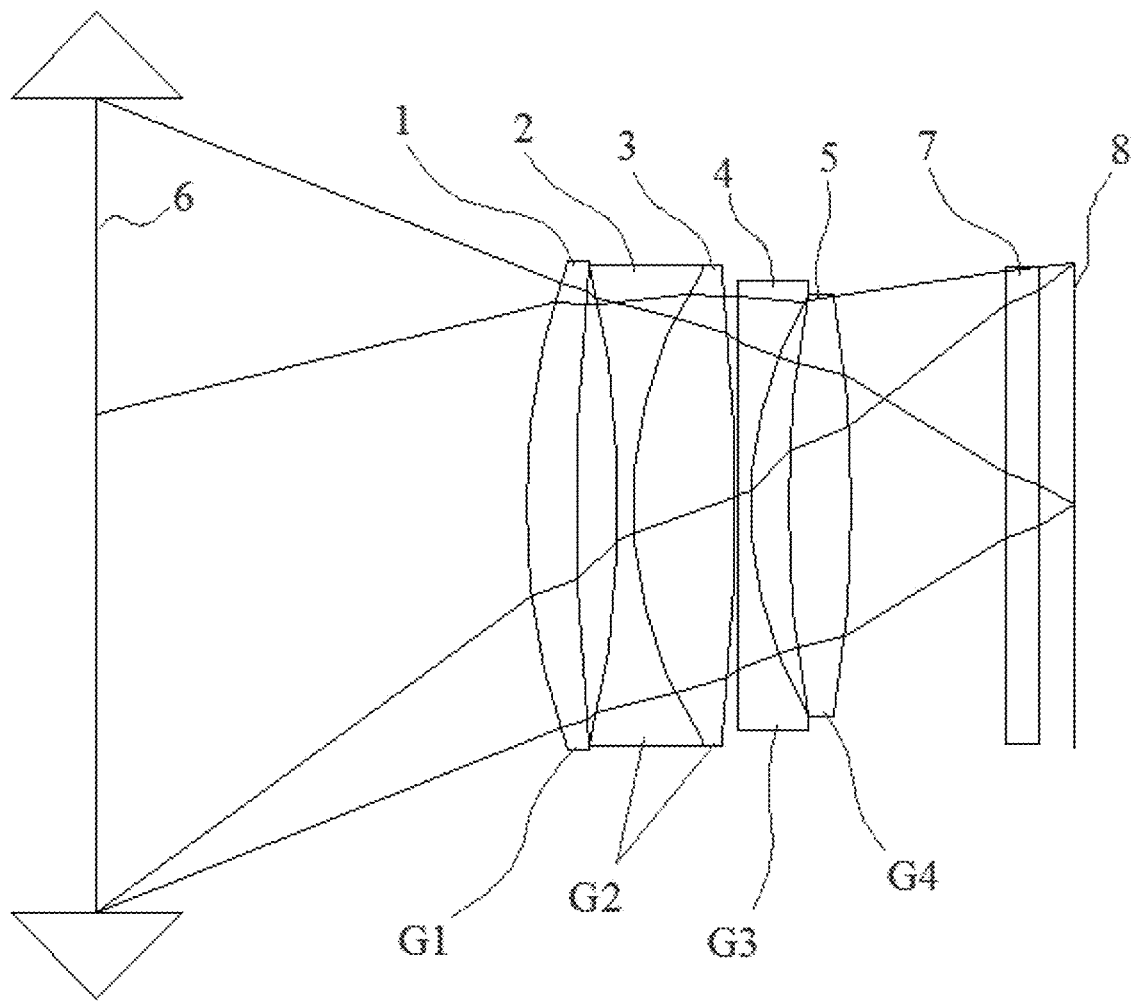
FIG. 22 is a schematic illustration according to embodiment 4.
Figure 23:
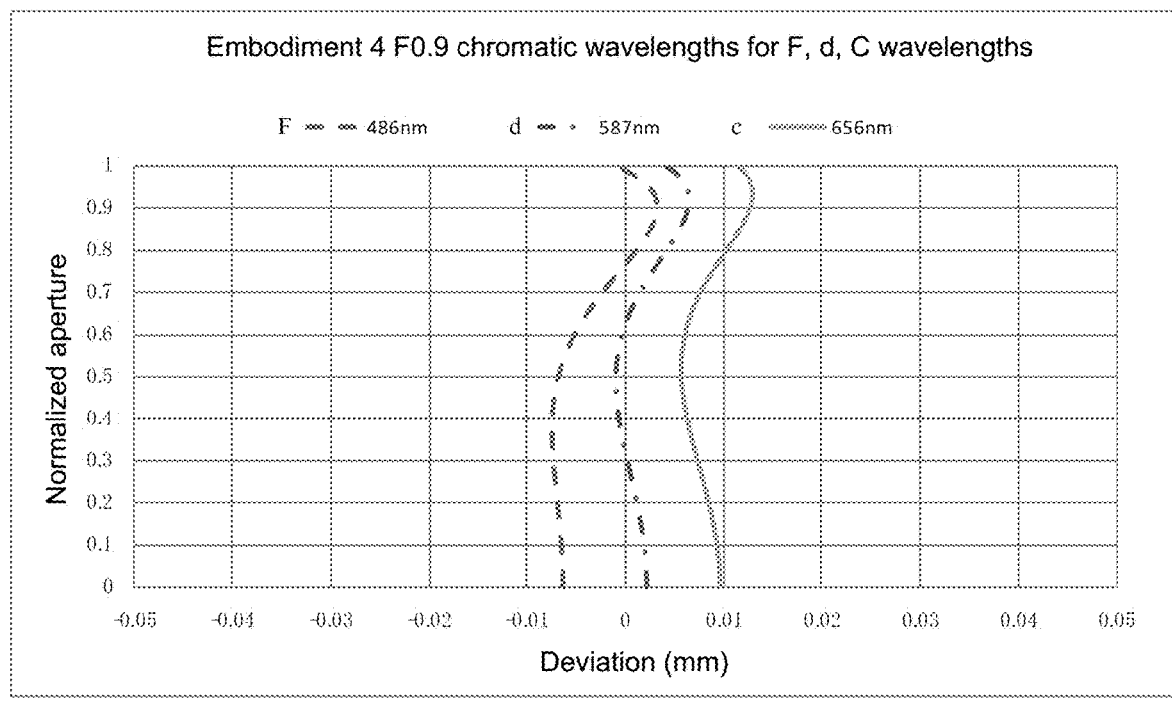
FIG. 23 shows the spherical aberrations of F, d and C wavelengths for f-number F0.9 according to embodiment 4.
Figure 24:
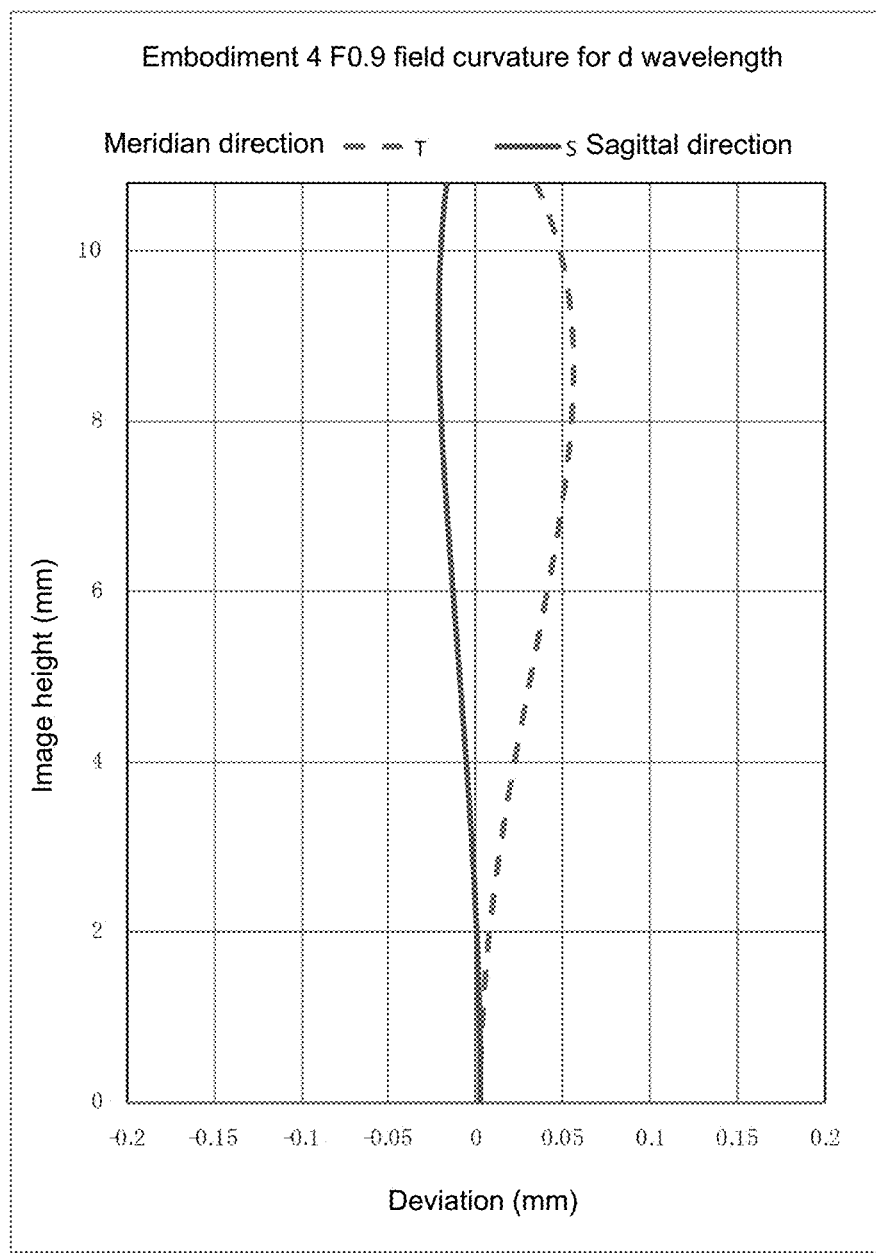
FIG. 24 shows the field curvature of d wavelength for f-number F0.9 according to embodiment 4.
Figure 25:
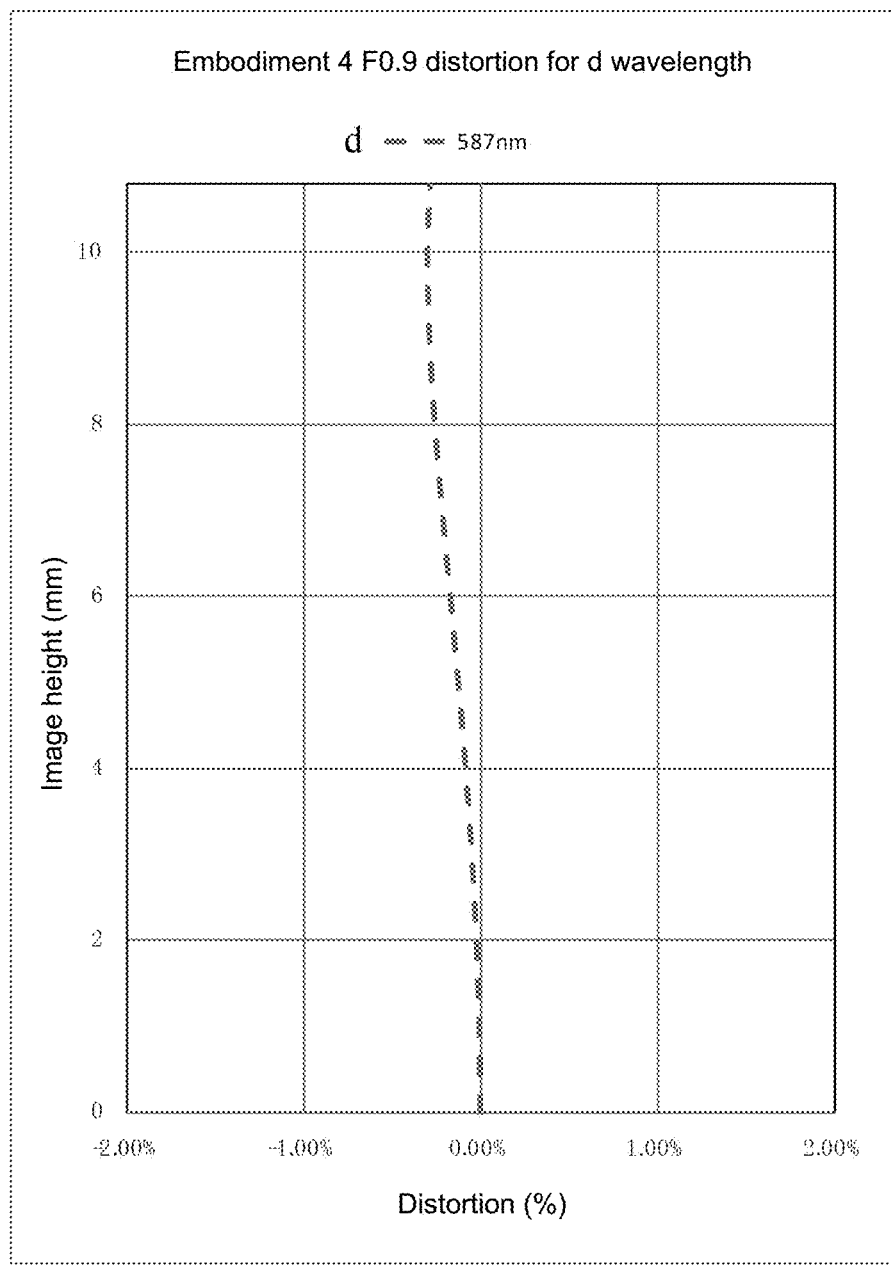
FIG. 25 shows the distortion of d wavelength for f-number F0.9 according to embodiment 4.
Figure 26:
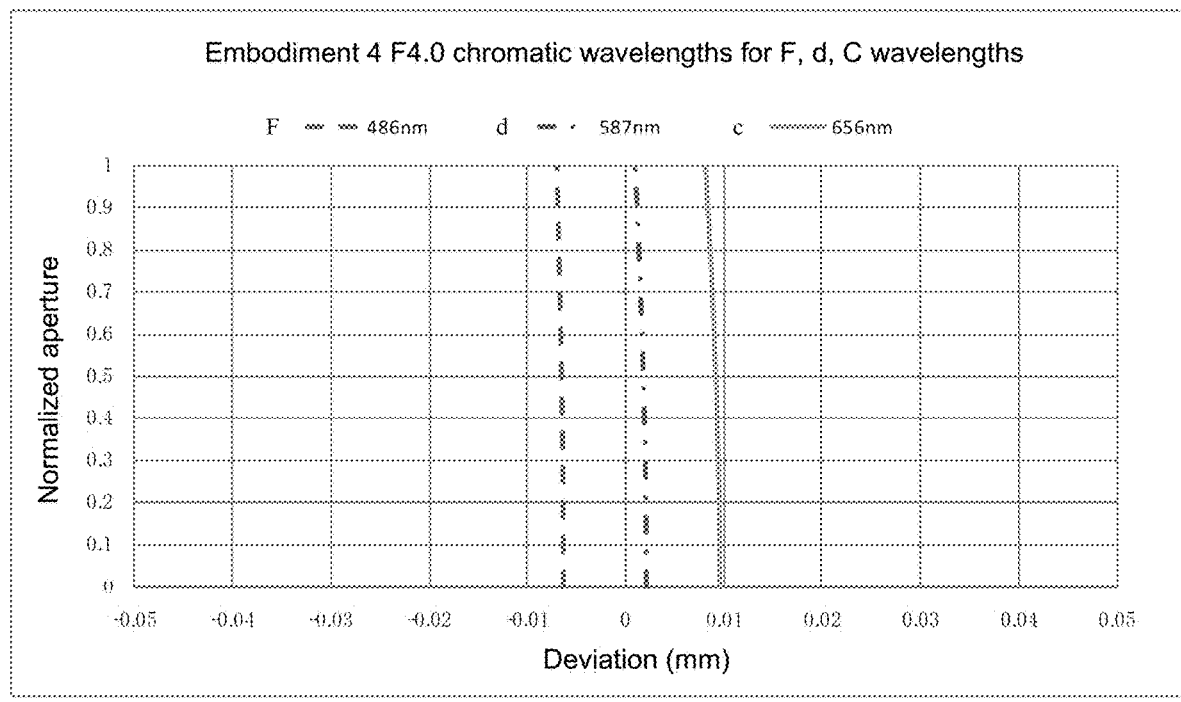
FIG. 26 shows the spherical aberrations of F, d and C wavelengths for f-number F4.0 according to embodiment 4.
Figure 27:
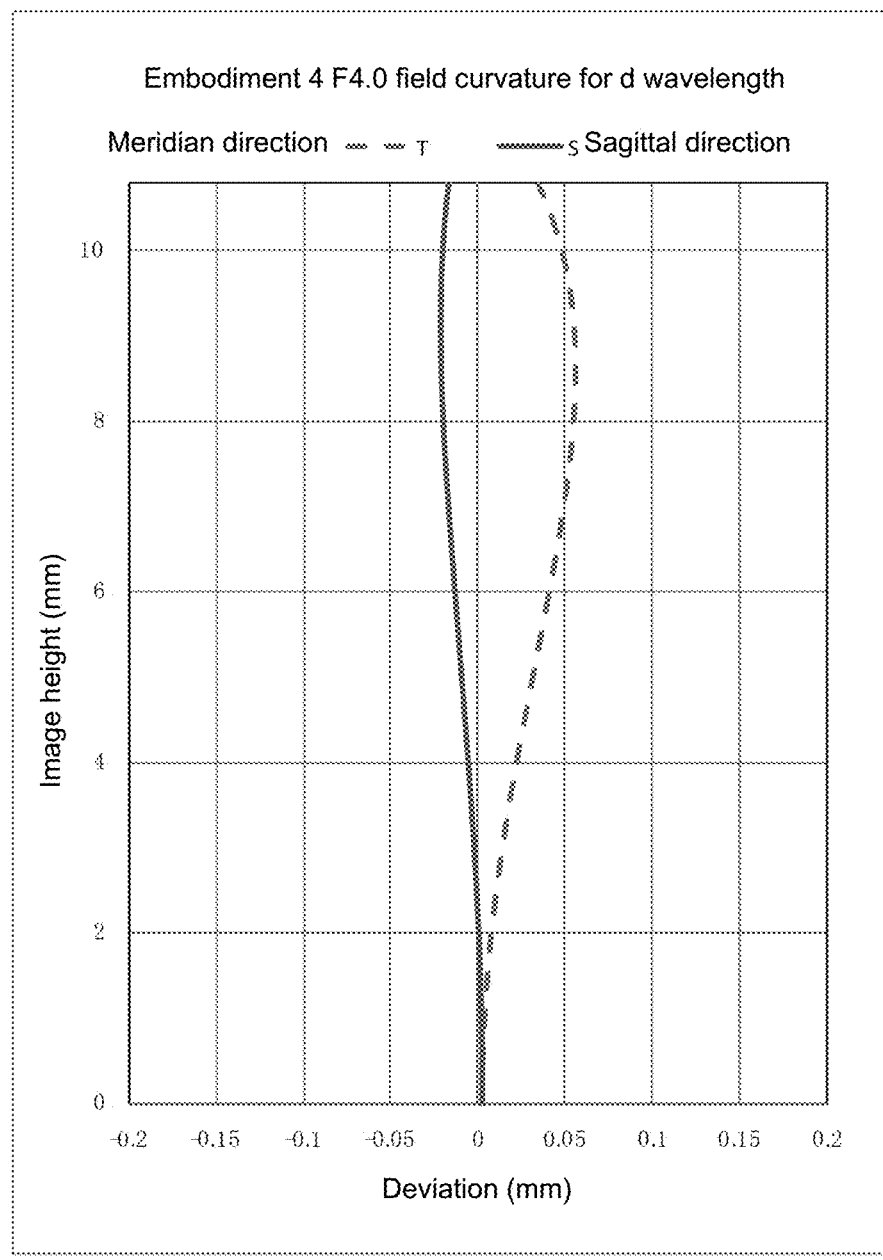
FIG. 27 shows the field curvature of d wavelength for f-number F4.0 according to embodiment 4.
Figure 28:
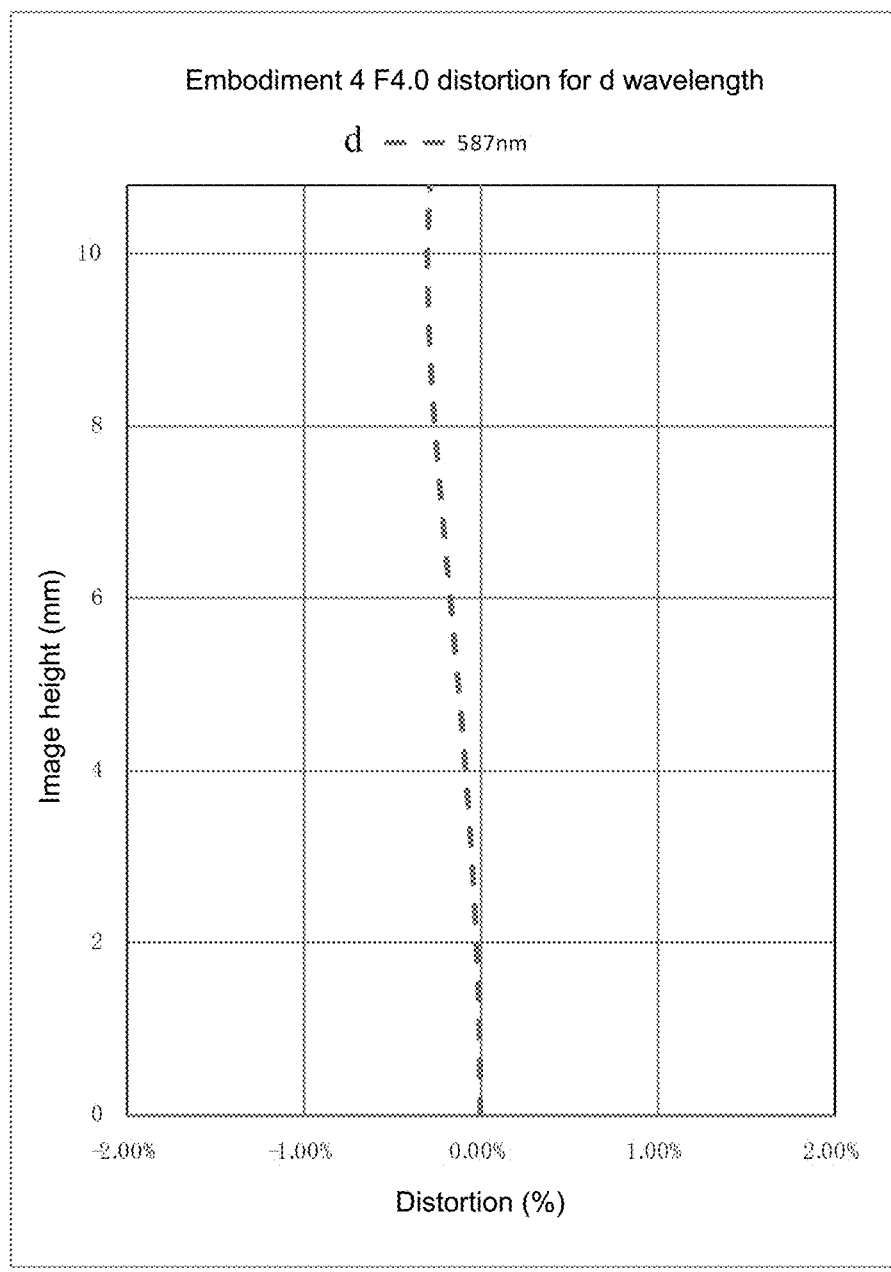
FIG. 28 shows the distortion of d wavelength for f-number F4.0 according to embodiment 4.

FIG. 22 illustrates embodiment 4 of the present invention, comprising a lens attachment of reduced focus and increased light admittance having 79.61 mm focal length and 0.71× magnification; the lens attachment comprises, in a sequential order from an object side to an image side, a first lens element 1 which is a crescent-shape spherical lens having a positive power wherein a front surface of the first lens element 1 is convex (bulging) towards the object side and a rear surface of the first lens element 1 is concave (depressed) towards the object side, a second lens element 2 which is a biconcave spherical lens having a negative power wherein a front surface of the second lens element 2 is concave (depressed) towards the image side and a rear surface of the second lens element 2 is concave (depressed) towards the object side, a third lens element 3 which is a biconvex spherical lens having a positive power wherein a front surface of the third lens element 3 is convex (bulging) towards the object side and a rear surface of the third lens element 3 is convex (bulging) towards the image side, a fourth lens element 4 which is a biconcave spherical lens having a negative power wherein a front surface of the fourth lens element 4 is concave (depressed) towards the image side and a rear surface of the fourth lens element is concave (depressed) towards the object side, and a fifth lens element 5 which is a biconvex spherical lens having a positive power wherein a front surface of the fifth lens element 5 is convex (bulging) towards the object side and a rear surface of the fifth lens element 5 is convex (bulging) towards the image side; the second lens element 2 and the third lens element 3 form a doublet by pairing with each other via adhesive.

An objective lens has a first vertex length; a combination of the lens attachment and the objective lens defines a second vertex length; the second vertex length is shorter than the first vertex length; wherein a "vertex length" represents a length from a vertex of an object-side surface of the objective lens to an image plane. The objective lens is configured as a 35 mm SLR (single-lens reflex) lens. The lens attachment has an object side mounted onto the 35 mm SLR lens and an image side mounted onto an imaging unit. A specification of the imaging unit is selected from the following: M4/3 format, APS-C format, or APS format. The object side of the lens attachment is configured as an interface that is adaptable to the objective lens to be connected. In order to evaluate optical performance, a paraxial lens 6 with a focal length of 60 mm is provided facing towards a side of the lens attachment at a position away from the lens attachment by 25 mm. Although an aperture diaphragm for the lens attachment is configured to align with the paraxial lens 6 for the purpose of evaluating aberrations, it is also possible to move the aperture diaphragm for the lens attachment axially within a wide range of values so that it corresponds to an exit pupil position of the objective lens it is connected to. Embodiment 4 is designed to be compatible with a wide range of objective lens exit pupil distances.

A flat plate 7 parallel to the plane simulates a color filter set in a camera; wherein the color filter set comprises a cover glass, an anti-aliasing filter, and an infrared absorption filter. An image plane 8 is placed approximately 57.76 mm away from the paraxial lens 6 having a focal length of 60 mm, which means a system comprising the objective lens and the lens attachment has a vertex length 2.24 mm shorter than that of the objective lens alone. The third lens element 3 and the fourth lens element 4 are both made of flint glass with high reflective index; the fifth lens element 5 is made of dense crown glass which is more chemically stable and less dense and has a good achromatic and apochromatic performance.

Embodiment 4 has a magnification of 0.71×, meaning that the focal length is reduced by factor 0.71; also, an aperture ratio of the objective lens is reduced via a full aperture. An image circle of the objective lens is also reduced by factor 0.71, meaning that in order to take full advantage of the Ø 28.2 mm image circle capacity of embodiment 4, the objective lens must have an image circle diameter of at least 28.2/0.71=39.72 mm. Since most of the 35 mm SLR lenses covering the standard 24×36 mm format have at least an image circle diameter of 43.27 mm, it means that a large number of suitable objective lens can be selected for use.

Further, as shown in FIG. 23 to FIG. 28, for F0.9 and F4.0 apertures, axial spherical aberrations produced by the F, d, and C wavelengths are from −0.01 mm to 0.012 mm, astigmatic field curvatures of d wavelength with respect to meridian direction and sagittal direction are from −0.03 mm to 0.06 mm, distortion of d wavelength is from −0.4% to 0%. Within a field of view of a normalized aperture, deviations measured for the chromatic aberrations of F, d, and c wavelengths are smaller than those in embodiments 1 and 2, meaning that there is only a very little increase in chromatic aberration after the lens attachment is mounted. The astigmatic field curvature and distortion are kept small, so as to minimize aggravation of astigmatic field curvature and distortion after the lens attachment is mounted.

Table 4a below shows the compositional data of embodiment 4. Table 4b below shows the specification data of embodiment 4.

TABLE 4a compositional data of embodiment 4

| Surface# | Surface type | Radius of curvature | Thickness | Glass |
|---|---|---|---|---|
| OBJ | | Infinity | Infinity | |
| STO | Perfect lens | Infinity | 25.00 | |
| 2 | Spherical lens | 42.634 | 2.93 | 2.01, 28.3 |
| 3 | Spherical lens | 136.744 | 2.47 | |
| 4 | Spherical lens | −59.680 | 0.80 | 1.69, 31.2 |
| 5 | Spherical lens | 24.910 | 6.05 | 2.00, 25.4 |
| 6 | Spherical lens | −114.936 | 0.10 | |
| 7 | Spherical lens | 1134.910 | 0.80 | 1.92, 18.9 |
| 8 | Spherical lens | 24.366 | 2.14 | |
| 9 | Spherical lens | 60.922 | 3.76 | 1.73, 54.8 |
| 10 | Spherical lens | −70.059 | 8.91 | |
| 11 | Flat lens | Infinity | 2.00 | 1.52, 52.2 |
| 12 | Flat lens | Infinity | 2.00 | |
| IMA | | Infinity | | |

TABLE 24 specification data of embodiment 4
Embodiment 4 - Specification

| Focal length | 79.61 mm |
|---|---|
| Magnification | 0.71x |
| Aperture ratio | F/0.90 |
| Diagonal of image | 28.2 mm |
| CvObj2 | −0.017 mm−1 |
| CvIma4 | 0.041 mm−1 |
| (CvObj2 + CvIma4)/φ | 1.933 |
| TL | 19.05 mm |
| TL · φ | 0.239 |

It should be understood that the lens attachment of the present invention can be used together with an objective lens and an imaging unit.

The above description is intended to describe the preferred embodiments of the present invention, and should not be considered limiting the present invention. Any changes, modifications or replacements achieving the same technical effects made upon the above embodiments in accordance with the essence of the present invention should fall within the scope of the present invention.

What is claimed is:

1. A lens attachment, adapted to be used with an objective lens; the lens attachment comprises, in a sequential order from an object side to an image side:
   a first lens assembly, comprising a first lens element which is a crescent-shape spherical lens having a positive power wherein a front surface of the first lens element is convex towards the object side and a rear surface of the first lens element is concave towards the object side;
   a second lens assembly, comprising a second lens element and a third lens element; the second lens element is a biconcave spherical lens having a negative power wherein a front surface of the second lens element is concave towards the image side and a rear surface of the second lens element is concave towards the object side, the third lens element is a biconvex spherical lens having a positive power wherein a front surface of the third lens element is convex towards the object side and a rear surface of the third lens element is convex towards the image side; the second lens element and the third lens element form a doublet by pairing with each other via adhesive;
   a third lens assembly, comprising a fourth lens element which is a biconcave spherical lens having a negative power wherein a front surface of the fourth lens element is concave towards the image side and a rear surface of the fourth lens element is concave towards the object side; and
   a fourth lens assembly, comprising a fifth lens element which is a biconvex lens having a positive power wherein a front surface of the fifth lens element is convex towards the object side and a rear surface of the fifth lens element is convex towards the image side;
   the lens attachment fulfills the following requirement:

$$1<(CvObj2+CvIma4)/\varphi<3; \text{ and } 0.5<M<1;$$

wherein φ is a power of the lens attachment, M is an overall magnification of the lens attachment, CvObj2 is a curvature of an object-side surface of the second lens element, CvIma4 is a curvature of an image-side surface of the fourth lens element;
   at least two of the third lens element, the fourth lens element and the fifth lens element are anomalous dispersion lenses.

2. The lens attachment of claim 1, wherein a combination of the lens attachment and the objective lens defines an f-number of 0.9 or greater.

3. The lens attachment of claim 2, wherein the lens attachment has undercorrected or overcorrected spherical aberration for as many as dual-wavelengths.

4. The lens attachment of claim 1, wherein the lens attachment fulfills the following requirement:

$$0.20 \leq TL \cdot \varphi \leq 0.25;$$

wherein TL is a vertex distance between an object-side surface of the first lens element and an image-side surface of a last lens element.

5. The lens attachment of claim 1, wherein the objective lens has a first vertex length; a combination of the lens attachment and the objective lens defines a second vertex length; the second vertex length is shorter than the first vertex length; wherein said vertex length represents a length from a vertex of an object-side surface of the objective lens to an image plane.

6. The lens attachment of claim 1, wherein the objective lens is configured as a 35 mm single-lens reflex lens; the lens attachment has an object side mounted onto the 35 mm single-lens reflex lens and an image side mounted onto an imaging unit.

7. The lens attachment of claim 6, wherein a specification of the imaging unit is selected from the following: M4/3 format, APS-C format, or APS format.

8. The lens attachment of claim 6, wherein the object side of the lens attachment is configured as an interface that is adaptable to the objective lens to be connected.

9. The lens attachment of claim 1, wherein the lens attachment also comprises a fifth lens assembly, comprising a sixth lens element which is a biconcave spherical lens having a negative power wherein a front surface of the sixth lens element is concave towards the image side and a rear surface of the sixth lens element is concave towards the object side; the sixth lens element is positioned on the image side of the fifth lens elements.

10. A lens attachment, adapted to be used with an objective lens and an imaging unit; the lens attachment comprises, in a sequential order from an object side to an image side:
    a first lens assembly, comprising a first lens element which is a crescent-shape spherical lens having a positive power wherein a front surface of the first lens element is convex towards the object side and a rear surface of the first lens element is concave towards the object side;

a second lens assembly, comprising a second lens element and a third lens element; the second lens element is a biconcave spherical lens having a negative power wherein a front surface of the second lens element is concave towards the image side and a rear surface of the second lens element is concave towards the object side, the third lens element is a biconvex spherical lens having a positive power wherein a front surface of the third lens element is convex towards the object side and a rear surface of the third lens element is convex towards the image side; the second lens element and the third lens element form a doublet by pairing with each other via adhesive;

a third lens assembly, comprising a fourth lens element which is a biconcave spherical lens having a negative power wherein a front surface of the fourth lens element is concave towards the image side and a rear surface of the fourth lens element is concave towards the object side; and a fourth lens assembly, comprising a fifth lens element which is a biconvex lens having a positive power wherein a front surface of the fifth lens element is convex towards the object side and a rear surface of the fifth lens element is convex towards the image side;

the lens attachment fulfills the following requirement:

$1 < (CvObj2 + CvIma4)/\varphi < 3$; and $0.5 < M < 1$;

wherein $\varphi$ is a power of the lens attachment, M is an overall magnification of the lens attachment, CvObj2 is a curvature of an object-side surface of the second lens element, CvIma4 is a curvature of an image-side surface of the fourth lens element;

at least two of the third lens element, the fourth lens element and the fifth lens element are anomalous dispersion lenses.

* * * * *